March 3, 1959 R. R. JOHNSON 2,876,437

ELECTRONIC CIRCUITS FOR SELECTIVELY SHIFTING OR INVERTING THE TIME POSITION OF DIGITAL DATA

Filed Dec. 28, 1953 6 Sheets-Sheet 1

INVENTOR.
ROBERT ROYCE JOHNSON,

BY Lester S. Hecht

HIS ATTORNEY.

INVENTOR.
ROBERT ROYCE JOHNSON,
BY
Lester S. Hecht
HIS ATTORNEY.

ELECTRONIC CIRCUITS FOR SELECTIVELY SHIFTING OR INVERTING THE TIME POSITION OF DIGITAL DATA

Filed Dec. 28, 1953 6 Sheets-Sheet 3

INVENTOR.
ROBERT ROYCE JOHNSON,
BY
Lester S. Hecht
HIS ATTORNEY.

INVENTOR.
ROBERT ROYCE JOHNSON,
BY Lester S. Hecht
HIS ATTORNEY.

March 3, 1959 R. R. JOHNSON 2,876,437
ELECTRONIC CIRCUITS FOR SELECTIVELY SHIFTING OR INVERTING THE TIME POSITION OF DIGITAL DATA
Filed Dec. 28, 1953
6 Sheets-Sheet 5

INVENTOR.
ROBERT ROYCE JOHNSON
BY
Lester S. Hecht
HIS ATTORNEY.

INVENTOR.
ROBERT ROYCE JOHNSON,
BY
Lester S. Hecht
HIS ATTORNEY.

United States Patent Office 2,876,437

Patented Mar. 3, 1959

2,876,437

ELECTRONIC CIRCUITS FOR SELECTIVELY SHIFTING OR INVERTING THE TIME POSITION OF DIGITAL DATA

Robert Royce Johnson, Pasadena, Calif., assignor, by mesne assignments, to Hughes Aircraft Company, a corporation of Delaware Application December 28, 1953, Serial No. 400,395

11 Claims. (Cl. 340—174)

Figure 1:
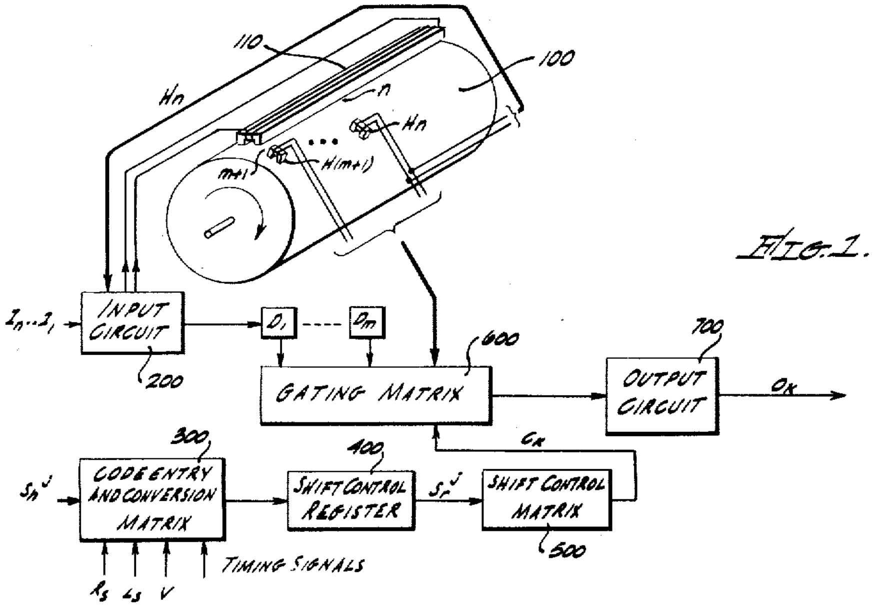

This invention relates to electronic circuits for selectively shifting or inverting the time position of digital data and, more particularly, to electronic shifting or inverting circuits which may be utilized in a magnetic drum computer wherein right or left shifts are to be performed as well as an inverting operation, all of the operations being performed through the same set of magnetic drum circuits and associated head selection matrices.

Shifting or inverting circuits as contemplated by the present invention are particularly useful in computing systems wherein digital arithmetic quantities are serially coded so that the time position of each digit in an arithmetic quantity corresponds to its weight or place. The shifting operation which is frequently required then is one wherein the time position of a series of digits must be shifted with respect to an absolute reference time interval and a specific circuit position. The inversion operation contemplated is one wherein a series of input signals $I_1 \ldots I_n$ appearing serially during reference time intervals $T_1 \ldots T_n$ are rearranged into a series in the order $I_n \ldots I_1$, during the time intervals $T_1 \ldots T_n$. In specific situations the shifting operation may be utilized to properly position the radix or decimal points of the arithmetic quantities and the inverting operation to rearrange arithmetic quantities coded serially with the least significant digit appearing first in time into a series suitable for left-to-right printing wherein the most significant digit must be printed first in time.

The present invention extends the principles introduced in copending U. S. patent application Serial No. 395,212 for "Electronic Circuits for Selectively Shifting the Time Position of Digital Data" by Michael May et al., filed November 30, 1953, and now forfeited; wherein the basic drum circuits and selection matrix elements utilized in the present invention are described.

The magnetic drum shifting circuit described in the copending application is specifically designed for a business data computer system wherein it is necessary to shift the time position of applied input signals with substantialfly no delay and in synchronism with the drum operation. Left shift operations may be performed without any delay except that inherent in the position change due to the shift, and right shift operations are performed during an operating time equal to N digit time intervals, where N is the number of digits represented by the applied input signals.

Selective shifting, according to the basic concept of the copending application, is achieved through a parallel writing circuit and a plurality of reading circuits R0, R1 . . . R$k$ . . . R$n$ providing output signals corresponding to applied input signals after delays of 0, 1 . . . $k$ . . . and $n$ digits, respectively, the letter $k$ being utilized to represent any of the delays 0 through $n$, and $n$ being the total number of delays required. Delays of $m+1$ through $n$ digits are provided by a corresponding series of drum reading heads H$(m+1)$ . . . H$n$, positioned from the parallel writing circuit, along the circumference of the magnetic drum in the direction of drum rotation so as to provide the desired write-read delays. The delay of $m+1$ digits represents the minimum head spacing between the writing circuit and reading head $(m+1)$ allowing reliable writing and reading without crosstalk or an undesirable increase in noise level. A series of delay sections D1 . . . D$m$ are utilized to provide delays less than the minimum drum write-read delay of $(m+1)$ digits.

Left shift operations of $k$ digits, in the circuit of the copending application, are performed by reading input signals I applied to the parallel writing circuit through circuit R$k$, introducing the requisite delay of $k$ digits. Right shift operations of $k$ digits are performed by initially recording signals I on the drum through the parallel writing circuit during $n$ successive digit time intervals and then reading the signals produced by reading circuit R$(n-k)$.

The amount of shift desired in the operation of the circuit of the copending application is specified by a shift selection signal $Sh^j$, where $j$ indicates the binary digit position in the code of the selection signal. During left shift operations, indicated by a control signal L$s$, signal $Sh^j$, representing a shift of $k$, is utilized to select reading circuit R$k$. During right shift operations, however, indicated by a control signal R$s$, signal $Sh^j$ representing a shift of $k$ is utilized to select reading circuit R$(n-k)$ and consequently each reading circuit must be selected according to two signals $Sh^j$, one indicating a delay of $k$ digits for left shift (L$s$) and the other a delay of $n-k$ digits for right shift (R$s$). As a result, a rather complicated right or left shift gating matrix is required wherein effectively two sets of gating elements are required, one set for left shift and one for right shift.

According to the present invention, during right shift operations of $k$ digits, the selection signal $Sh^j$ is converted to an "$n$'s" complement signal corresponding to the number $n-k$, so that each reading circuit is selected according to only one selection signal $Sh^j$. Thus, during a left shift of $k$ digits, signal $Sh^j$ represents the number $k$ and controls the selection of circuit R$k$; and during a right shift of $n-k$ digits signal $Sh^j$ represents the number $[n-(n-k)]=k$, again controlling the selection of circuit R$k$. As a result only a single gating matrix is required wherein each reading head H$k$ is selected according to a selection signal $Sh^j$ representing the number $k$.

The circuits introduced according to the present invention to provide the "$n$'s" complement signal are readily modified to provide a series of conversion signals providing right shifts of $n-1$, $n-3$ . . . and 0 digits which may be utilized to control the selective shifting required for inverting a series of applied input signals $I_1 \ldots I_n$ to produce an output series $I_n \ldots I_1$. In one manner of operation the same set of reading heads and gating circuits may be utilized to perform an inversion in $2n$ digit time intervals, the only additional circuits required over those utilized for right and left shift operations being the circuits for producing the series of conversion signals. Thus, by converting the shift selection signals according to the present invention it is possible to achieve any of the operations of left shift, right shift, or inversion with a minimum of gating circuits.

In the basic embodiment of the present invention a code entry and conversion matrix is utilized to enter applied shift selection signals $Sh^j$ into shift selection register for left shift operations, to form the "$n$'s" complement of signals $Sh^j$ during right shift, and to form a series of converted signals $Sh^j$ during an inversion operation signalled by a control signal V. The register produces signal $Sr^j$ corresponding to signals entered therein through the conversion matrix, signal $Sr^j$ being utilized to control the generating of control signals C$k$ produced in a shift control matrix. Each signal C$k$ controls the selective gating of signals produced by a reading circuit R$k$ through an output gating matrix which produces a series of signals corresponding to applied input signals I after right or left shift operations or inversion.

Accordingly it is an object of the present invention to provide an electronic circuit for selectively shifting or inverting the time position of digital data wherein the circuit elements required for shifting may be utilized as well for inverting, a minimum of additional circuit elements being required.

A further object is to provide an electronic shifting circuit wherein shift selection signals are converted to "*n*'s" complement signals, *n* being the maximum number of shifts required; the shifting circuit requiring only a single gating matrix wherein each selection is made according to the same selection signal for both right and left shift.

Another object is to provide an electronic circuit for selectively inverting an applied series of signals $I_1 \ldots In$ to form the series of signals $In \ldots I_1$, the inversion being performed according to a series of shift selecting signals.

Still a further object is to provide a time position shifting circuit for serial computing systems wherein coded shift selection signals, specifying the amount of shift desired, are converted into corresponding sets of converted signals in a manner making it possible to perform all shift selections according to a signal code for both right and left shifts.

Yet another object is to provide an electronic circuit for selectively shifting or inverting an applied signal series $I_1 \ldots In$, the selection being performed through a single magnetic drum head selecting matrix, each of the selections being made according to one of a set of code signals corresponding to a converted set of applied shift selection signals.

The novel features which are believed to be characteristic of the invention, both as to its organization and method of operation, together with further objects and advantages thereof, will be better understood from the following description considered in connection with the accompanying drawings in which two species of the invention are illustrated by way of examples. It is to be expressly understood, however, that the drawings are for the purpose of illustration and description only, and are not intended as a definition of the limits of the invention.

Figure 6:
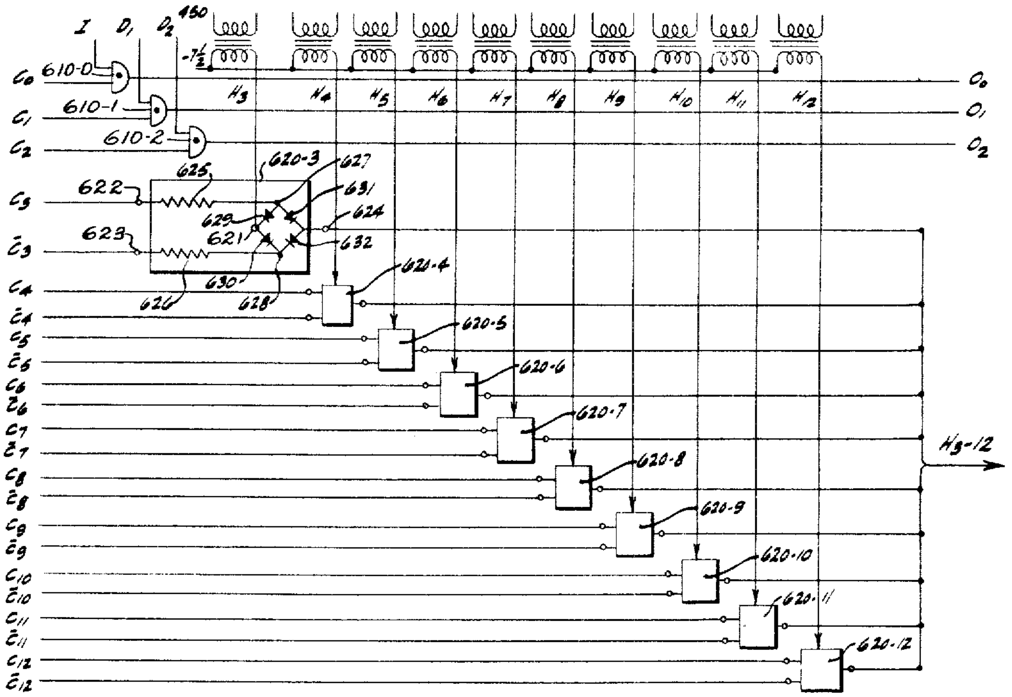
Figure 1A:
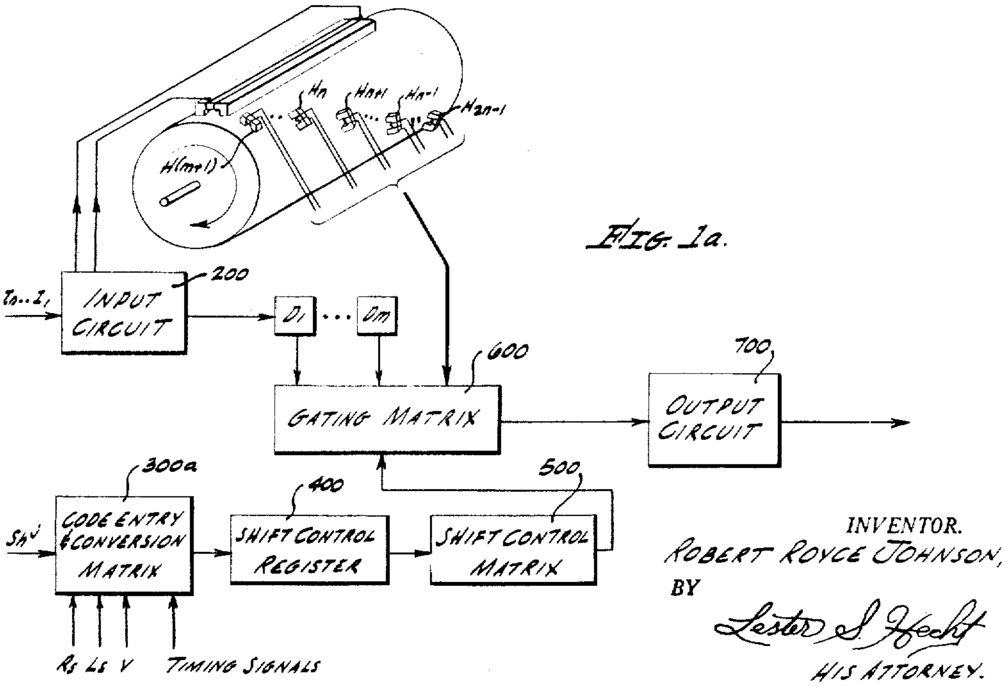
Figure 2:
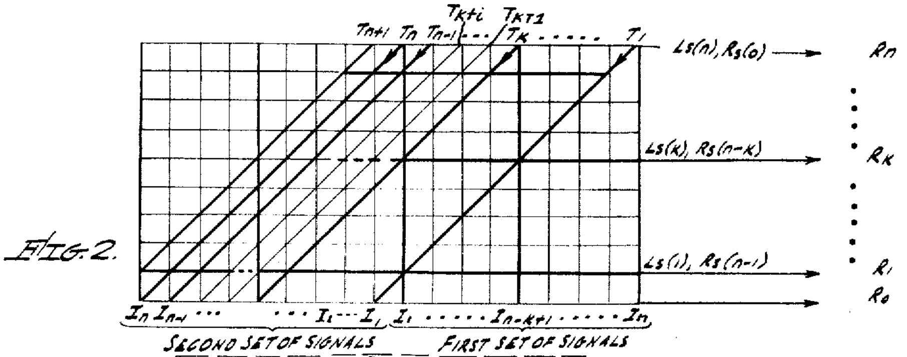
Figures 2, 3:
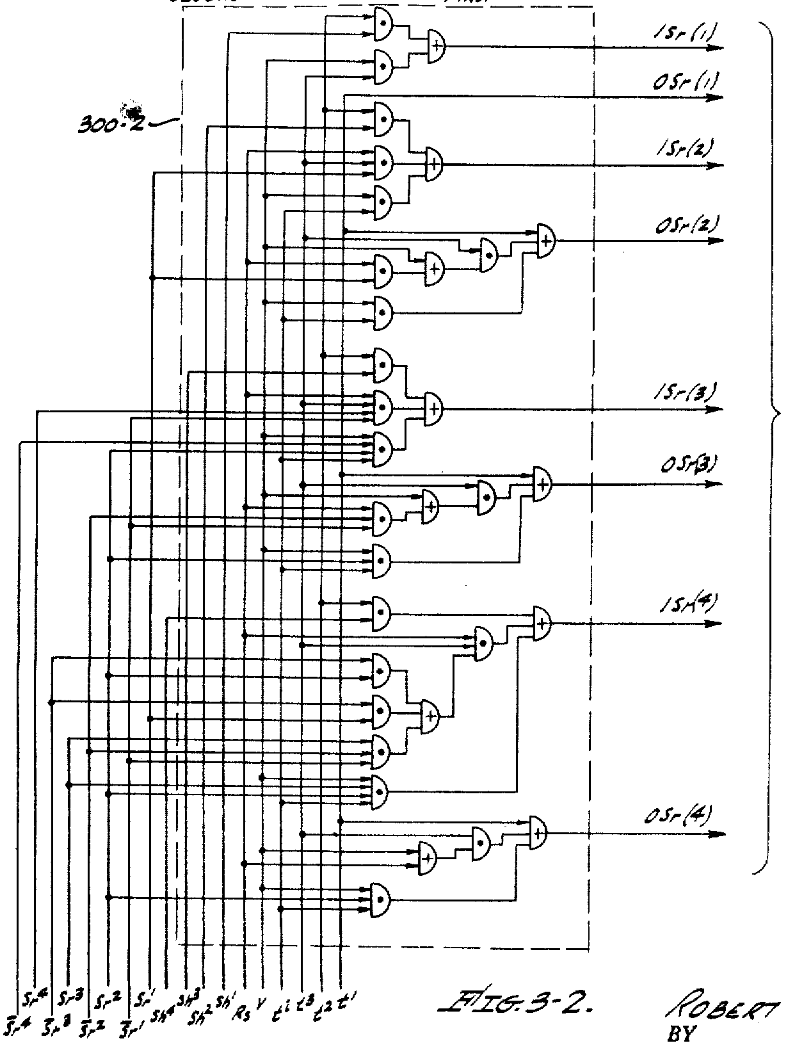
Figure 3A:
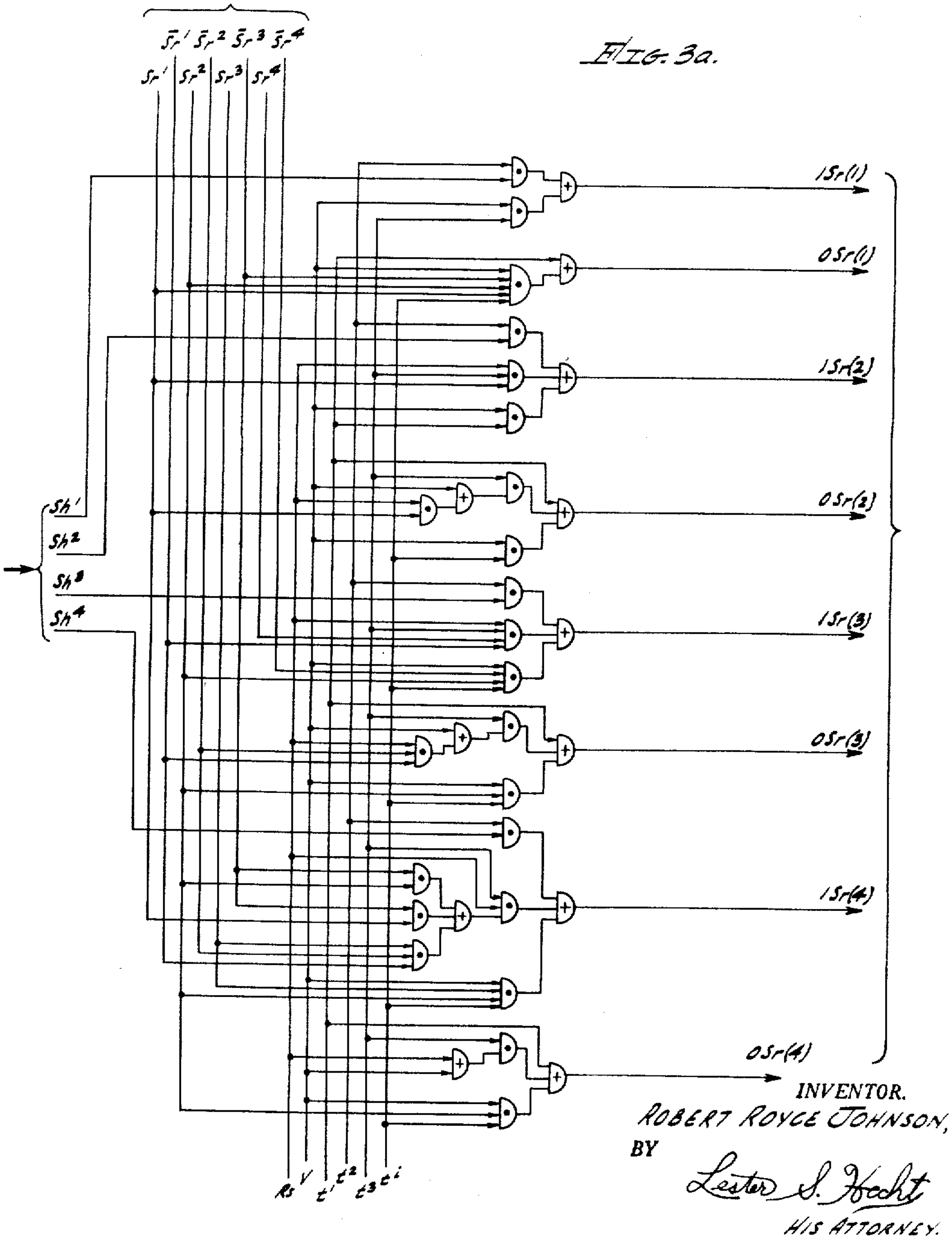
Figure 2A:
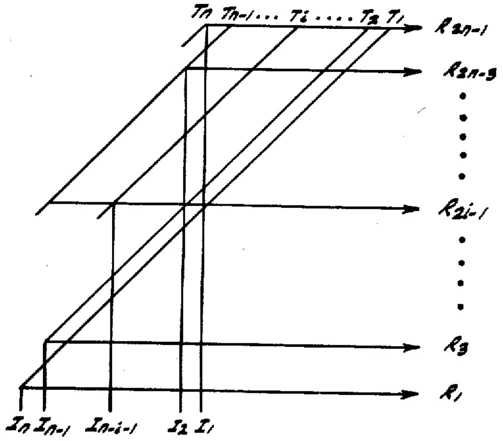
Figure 6A:
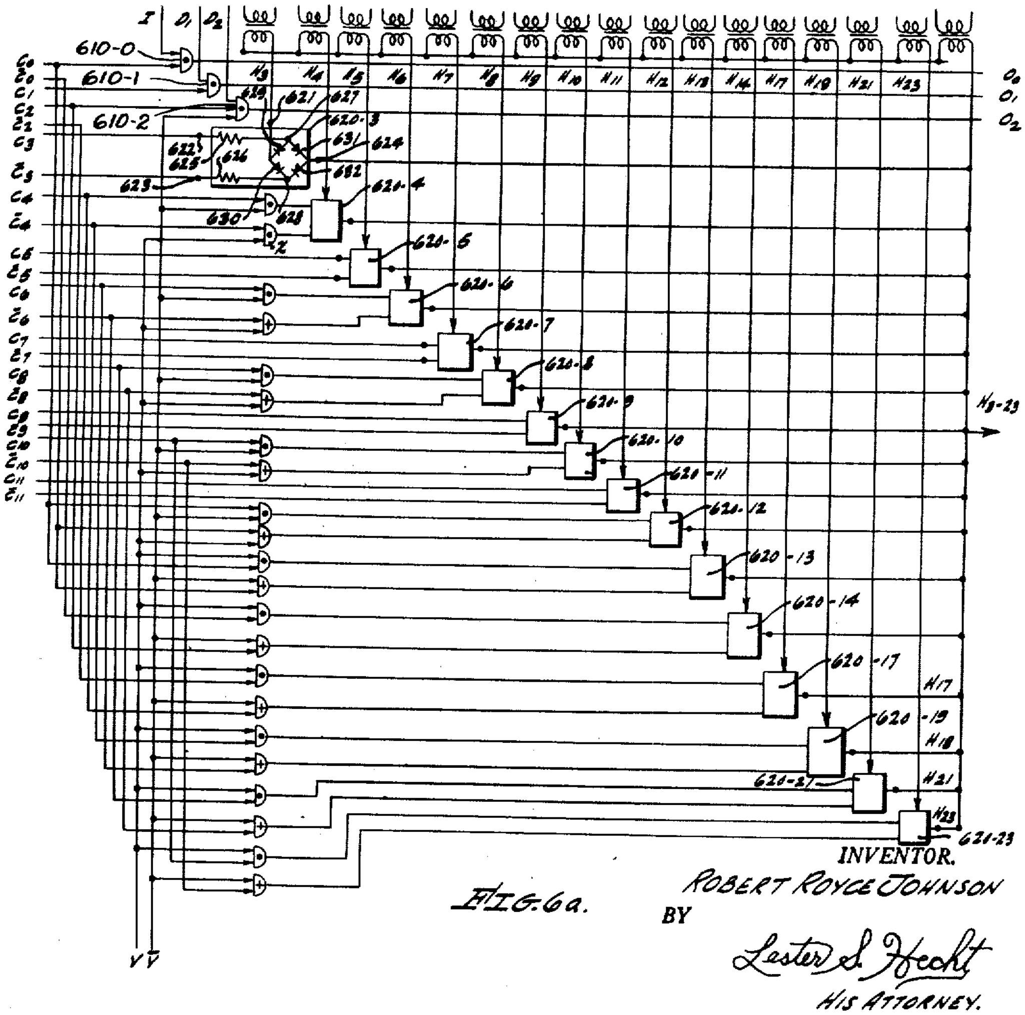
Figure 5:
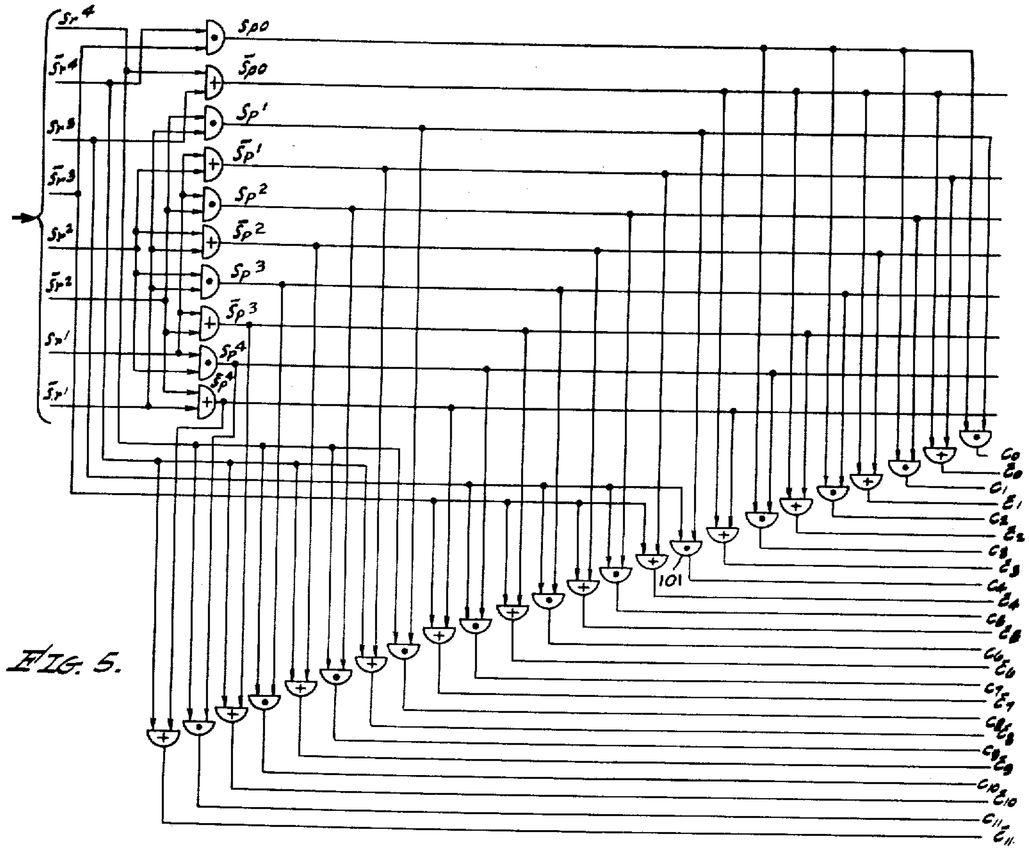
Figure 4:
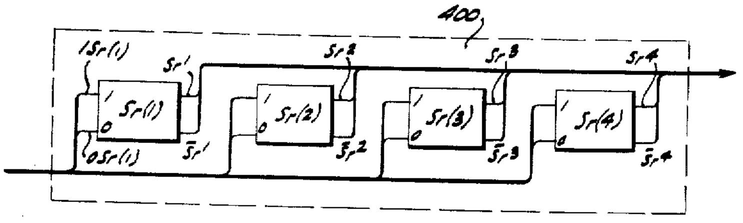

Figs. 1 and 1*a* are block diagrams of forms of shifting or inverting circuits according to the present invention wherein inversions may be performed in 2*n* digit time intervals and *n* digit time intervals, respectively;

Figs. 2 and 2*a* respectively illustrate the operation of the embodiments of Fig. 1 and Fig. 1*a*;

Figs. 3–1, 3–2, and 3*a* respectively illustrate: a suitable form of code entry and conversion matrix 300 of Fig. 1, for entering and converting signals for right or left shift operations; a form of matrix 300 for entering signals and performing conversions for any of the operations of right shift, left shift, or inversion; and a suitable form of matrix 300*a* of the embodiment of Fig. 1*a*;

Fig. 4 illustrates a suitable form for shift selection signal registers 400 and 400*a* in the embodiments of Fig. 1 and Fig. 1*a*;

Fig. 5 illustrates a suitable form for shift control matrices 500 and 500*a* of Figs. 1 and 1*a*, respectively; and Figs. 6 and 6*a* respectively illustrate suitable forms for gating matrices 600 and 600*a* of Figs. 1 and 1*a*.

Reference is now made to Fig. 1 wherein there is shown one embodiment of selective shifting or inverting circuit according to the present invention. As shown in Fig. 1, the shifting or inverting circuit comprises a magnetic drum circuit including a drum 100, a parallel writing head 110, and a series of reading heads $H(m+1) \ldots Hn$ positioned along the circumference of drum 100 in the direction of drum rotation, as indicated, so as to provide write-read delays of $(m+1) \ldots n$ digits, respectively.

An input signal series $I_1 \ldots In$ to be shifted or inverted is applied to an input circuit 200 which is operative to write signals I (referring to any of the signals in the series) through head 110 onto drum 100. Input circuit 200 is also coupled to the first of a plurality of series connected delay sections $D1 \ldots Dm$, the number *m* of delay sections being determined by the minimum head spacing permissible between writing head 110 and reading head $H(m+1)$, as is more fully explained in the above-mentioned copending application by Michael May et al. In the discussion which follows all reading circuits, whether associated with delay sections $D1 \ldots Dm$, heads $H(m+1) \ldots Hn$, or responsive to signals I without delay, are referred to as circuits $R0, R1 \ldots Rk \ldots Rn$ producing output signals $R_0, R_1 \ldots R_k \ldots R_n$ after delays of $0, 1, \ldots k \ldots$ and *n* digits, respectively.

The amount of right or left shift desired in the operation of the embodiment of Fig. 1 is specified by a selection signal $Sh^j$ applied to a code entry and conversion matrix 300, *j* indicating the binary digit position in the code of the selection signal as will be more fully understood when a specific code is considered. Signals *Rs*, *Ls*, and V respectively indicating that operations of right shift, left shift, and inversion are to be performed are also applied to conversion matrix 300.

During left shift operations matrix 300 is effective to transfer signals $Sh^j$ directly to a shift control register 400 which produces corresponding output signals $Sr^j$; whereas during right shift operations matrix 300 first functions to enter signals $Sh^j$ into register 400 and then functions to actuate register 400 to form the "*n*'s" complement of signals $Sh^j$ in a manner to be described. During inversion operations matrix 300 actuates register 400 to produce a series of signals $Sr^j$ defining a shift selection such that signals $I_n \ldots I_1$ are read during reference time intervals $T_1 \ldots T_n$, respectively.

Signals $Sr^j$ produced by register 400 are applied to a shift control matrix 500 which produces corresponding shift control signals $C_k$ utilized in gating matrix 600 to control the selection of signal $R_k$; selected signal $R_k$ being applied to an output circuit 700 which produces a corresponding output signal $O_k$. During left shift operations signal $C_k$ corresponds to a selection signal $Sh^j$ representing a shift of *k* digits in the selection code; during right shift operations signal $C_k$ corresponds to a selection signal $Sh^j$ representing a shift of $n-k$ digits in the selection code, but again controls the selection of $R_k$. Thus, the conversion of input signal $Sh^j$ into signal $Sr^j$ produced by register 400 makes it possible to produce a single set of shift control signals $C_k$ for the selection of signals $R_k$, respectively.

It will be noted that, during inversion operations (V), signal $H_n$ is also applied to input circuit 200 so that input signals I are effectively recirculated through the input circuit after a delay of *n* digits. The recirculation is continued for a period of *n* digits so that effectively two sets of signals $I_1 \ldots I_n$ are available at input circuit 200 during 2*n* digit time intervals. During the inversion operation, a series of signals $Sr^j$ and corresponding signals $C_k$ are produced, signals $C_k$ being utilized to select a series of signals $R_k$ providing the desired inversion.

Specific structure suitable for the magnetic drum circuit, input circuit 200, output circuit 700, and delay sections $D1 \ldots Dm$ is not considered herein because structures and programming techniques for providing the desired signal sequences are well known in the digital computer art. An example of structure which may be employed is described in the above-mentioned copending application, Michael May et al.

Structure suitable for code entry and conversion matrix 300, shift selection signal register 400, shift control matrix 500, and gating matrix 600 is considered in detail below, specific references being made to Figs. 3–1, 3–2, 3*a*; 4; 5; and 6, 6*a*. Since the specific mechanizations are based upon sets of defining algebraic equations, it is important to consider first the basic operation and theory. Thus, in the immediate following discussion a logical analysis is made of the general function of the shifting or inverting system of Fig. 1, reference being also made to Fig. 2 wherein the time sequence of operation of the embodiment of Fig. 1 is illustrated.

Referring now to Fig. 2, it is noted that signals $R_0$ . . . $R_k$ . . . and $R_n$ are utilized to represent ordinants and that two sets of input signals I are utilized to represent $2n$ abscissa variables. A series of diagonal time reference lines $T_i$ ($i$ representing any integer 0 through $n+1$) are shown, the intersection of an ordinant variable $R_k$ and a diagonal time variable $T_i$ providing the time correlation between signal $R_k$ and an input signal $I_{n-k+i}$ of the first set of input signals and the intersection of a time variable $T_{k+i}$ and $R_k$ providing the correlation between signal $R_k$ and input signal $I_i$ of the second set of input signals.

The first set of input signals I corresponds to those which are initially entered on to drum 100 during $n$ successive digit time intervals, the initial $n$ digit period being required both for right shift and inversion operations. The second set of input signals I corresponds to signals being applied to input circuit 200 during left shift operations, or to the signals of the first set which are reapplied during the second set of $n$ digit time intervals of a $2n$ digit time interval inversion operation.

During left shift operations, signal $R_k$, represented by the corresponding ordinant, corresponds to input signal $I_i$ of the second set during any time interval $T_{k+i}$. Thus, signal $R_1$ corresponds to signals $I_1$ . . . $I_n$ during time intervals $T_2$ . . . $T_{n+1}$, respectively, providing a left shift or time position change of one digit. In the example set forth in the previous sentence, $K=1$ and $i$ has successive values from "1" to "$n$" such that a left shift of one position is provided. Similarly, signal $R_{n-1}$ corresponds to signals $I_1$ . . . $I_n$ of the second set during time intervals $T_n$ . . . $T_{2n-1}$, respectively, providing a left shift or time position change of $n-1$ digits. In the example set forth in the previous sentence, $K=n-1$ and $i$ has successive values from "1" to "$n$" such that a delay of $n-1$ positions is provided. During right shift signal $R_k$ corresponds, during any time interval $T_i$, to the input signal $I_{n-k+i}$ of the first set. Thus, signal $Rn$ corresponds to signals $I_1$ . . . $I_n$ during time intervals $T_1$ . . . $T_n$ providing a zero right shift, and signal $R_1$ corresponds to signals $I_n$ . . . $I_{2n-1}$ during time intervals $T_1$ . . . $T_n$ providing a right shift of $n-1$ digits.

As explained in co-pending application Serial No. 395,212, a right shift of K digits is obtained by delaying the production of signals for $n-K$ digits where a word has $n$ positions. By providing such a delay, a middle portion of the word becomes shifted on a first presentation of the word to the positions of least significance on the next presentation of the word. This is desired since a right shift involves a change in the portion of a word to positions of decreased significance. Because of the delay of $n-K$ positions, the delay decreases as to the value of K becomes increased. This may be seen from the right half of Figure 2.

From the foregoing analysis, it is apparent that the right and left shift signals $R_k$ may be respectively defined as:

($Rs$) $R_k=I_{n-k+i}$ (during any time interval $T_i$).
($Ls$) $R_k=I_i$ (during any time interval $T_{k+i}$).

These equations indicate that each circuit $Rk$ either performs a right shift of $n-k$ digits or a left shift of $k$ digits. Thus, circuit $R_k$ is selected by signal $Sr_j=k$ during a left shift of $k$ digits and is selected by signal $Sr^j=n-(n-k)=k$ during a right shift of $n-k$ digits.

In order to illustrate specific circuits for forming the $n$'s complement, it is necessary to assume a value for $n$ and a code set for shift signal $Sh^j$. As an example, it will be assumed that $n$ is equal to 12 and that signal $Sh^j$ is a binary-coded signal in the conventional manner indicated in Table I, below, where digits $Sh^1$, $Sh^2$, $Sh^3$, and $Sh^4$ respectively have weights of 1, 2, 4, and 8.

*Table I*

| Amount Shift | $Sh^j$ | | | | Amount Shift | $12-Sh^j$ | | | |
|---|---|---|---|---|---|---|---|---|---|
| | $Sh^4$ | $Sh^3$ | $Sh^2$ | $Sh^1$ | | $Sr^4$ | $Sr^3$ | $Sr^2$ | $Sr^1$ |
| (0)------- | 0 | 0 | 0 | 0 | (12)----- | 0 | 0 | 0 | 0 |
| (1)------- | 0 | 0 | 0 | 1 | (11)----- | 1 | 0 | 1 | 1 |
| (2)------- | 0 | 0 | 1 | 0 | (10)----- | 1 | 0 | 1 | 0 |
| (3)------- | 0 | 0 | 1 | 1 | (9)------ | 1 | 0 | 0 | 1 |
| (4)------- | 0 | 1 | 0 | 0 | (8)------ | 1 | 0 | 0 | 0 |
| (5)------- | 0 | 1 | 0 | 1 | (7)------ | 0 | 1 | 1 | 1 |
| (6)------- | 0 | 1 | 1 | 0 | (6)------ | 0 | 1 | 1 | 0 |
| (7)------- | 0 | 1 | 1 | 1 | (5)------ | 0 | 1 | 0 | 1 |
| (8)------- | 1 | 0 | 0 | 0 | (4)------ | 0 | 1 | 0 | 0 |
| (9)------- | 1 | 0 | 0 | 1 | (3)------ | 0 | 0 | 1 | 1 |

It will be noted that only the input code sets (0) through (9) are included since it is assumed that no right shift greater than nine is desired. It will be understood, however, that right shifts (0) through (12) may be provided for if desired.

In Table I, the quantities designated as $Sh^1$, $Sh^2$, $Sh^3$ and $Sh^4$ may represent the state of operation of corresponding flip-flops. As previously explained, the quantities designated as $Sh^1$, $Sh^2$, $Sh^3$ and $Sh^4$ have weighted values of 1, 2, 4 and 8. By providing the quantities designated as $Sh^1$, $Sh^2$, $Sh^3$ and $Sh^4$ with different patterns of operation, any desired value between "1" and "12" can be produced. These different patterns of operation represent the amount of shift to be produced in a left shift operation. The amount of shift may be indicated by the general designation $Sh^j$. As previously explained, the amount of shift for a right shift operation may be indicated as $n-Sh^j$, where $n$ is the number of digital positions in a word. In Table I, $n$ is assumed to be equal to "12." The quantity $n-Sh^j$ may be indicated by the general designations $Sr^j$. The quantity $Sr^j$ may be indicated by the state of operation of a plurality of flip-flops designated as $Sr(1)$, $Sr(2)$, $Sr(3)$ and $Sr(4)$. The pattern of operation of the flip-flops $Sr(1)$, $Sr(2)$, $Sr(3)$ and $Sr(4)$ correspond to the pattern of operation of the flip-flop $Sh(1)$, $Sh(2)$, $Sh(3)$ and $Sh(4)$ for similar values. This may be seen by comparing the pattern of operation of the $Sr(1)$, $Sr(2)$, $Sr(3)$ and $Sr(4)$ flip-flops with the pattern of operation of the $Sh(1)$, $Sh(2)$, $Sh(3)$ and $Sh(4)$ flip-flops when $Sr^j$ and $Sh^j$ have decimal values of "9."

In order to simplify the circuitry required to indicate $Sh^j$ and $Sr^j$, these quantities may be indicated in successive time intervals. During a first time interval, the quantity $Sh^j$ may be indicated by the $Sr(1)$, $Sr(2)$, $Sr(3)$ and $Sr(4)$ flip-flops. Subsequently, the flip-flops $Sr(1)$, $Sr(2)$, $Sr(3)$ and $Sr(4)$ may be triggered to indicate $Sr^j$. The logic for triggering the $Sr(1)$, $Sr(2)$, $Sr(3)$ and $Sr(4)$ flip-flops to indicate $Sr^j$ is set forth in the next paragraph.

The conversion of signals $Sh^j$ to form the 12's complement signals $Sr^j$ as indicated in Table I may be defined according to the following algebraic functions:

$$Sr^1=Sh^1$$

$$Sr^2=Sh^2\cdot\overline{Sh}^1+\overline{Sh}^2\cdot Sh^1$$

$$Sr^3=Sh^3\cdot(Sh^2+Sh^1)+Sh^4\cdot\overline{Sh}^1$$
$$=Sh^3\cdot Sh^2+Sh^3\cdot Sh^1+Sh^4\cdot\overline{Sh}^1$$

$$Sr^4=\overline{Sh}^3\cdot(Sh^2+Sh^1)+Sh^3\cdot\overline{Sh}^2\cdot\overline{Sh}^1$$
$$=\overline{Sh}^3\cdot Sh^2+\overline{Sh}^3\cdot Sh^1+Sh^3\cdot\overline{Sh}^2\cdot\overline{Sh}^1$$

where the dot (.) represents the logical "and" and the plus (+) the logical inclusive "or." As defined in the above functions, the signal $Sr^1$ is equal to $Sh^1$ signifying that no conversion is required. The signal $Sr^2$ is equal to the complement of $Sh^1$, $\overline{Sh}^1$, when the signal $Sh^2$ is 1 and is equal to the signal $Sh^1$ when the signal $Sh^2$ is 0 or the complementary signal $\overline{Sh}^2$ is 1. The definition of the other conversions should be apparent from these examples.

The logic for $Sr^1$, $Sr^2$, $Sr^3$ and $Sr^4$ set forth in the previous paragraph may be seen from Table I. For example, it will be seen from Table I that the $Sr(1)$ flip-flop is true whenever the $Sh(1)$ flip-flop is true. For this reason, $Sr^1=Sh^1$. Similarly, the $Sr(2)$ flip-flop has a true state of operation whenever only one of the flip-flops $Sh(1)$ and $Sh(2)$ is true and the other one of the flip-flops $Sh(1)$ and $Sh(2)$ is false. This can be represented as $Sr^2=Sh^2.\overline{Sh}^1+\overline{Sh}^2.Sh^1$.

The $Sr(3)$ flip-flop is true for decimal values of "5" to "8" inclusive for $Sh^j$. Decimal values of "6" and "7" for $Sh^j$ can be represented as $Sh^3.Sh^2$. Similarly, a decimal value of "5" for $Sh^j$ can be represented as $Sh^3.Sh^1$ and a decimal value of "8" can be represented as $Sh^4.\overline{Sh}^1$. The $Sr(4)$ flip-flop has a true state of operation for decimal values of "1" to "4," inclusive, for $Sh^j$. Decimal values of "2" and "3" for $Sh^j$ can be represented as $\overline{Sh}^3.Sh^2$. Similarly, a decimal value of "1" for $Sh^j$ can be represented as $\overline{Sh}^3.Sh^1$ and a decimal value of "4" for $Sh^j$ can be represented as $Sh^3.\overline{Sh}^2.\overline{Sh}^1$.

The signals $Sr^j$ as defined above are entered into corresponding flip-flops $Sr(j)$ in register 400, the general structural form of which is illustrated in Fig. 4. As indicated in Fig. 4, flip-flops $Sr(1)$, $Sr(2)$, $Sr(3)$, and $Sr(4)$ include 1 and 0 input circuit pairs $1Sr(1)$, $0Sr(1)$; $1Sr(2)$, $0Sr(2)$; $1Sr(3)$, $0Sr(3)$; and $1Sr(4)$, $0Sr(4)$; and produce complementary signal pairs $Sr^1$, $\overline{Sr}^1$; $Sr^2$, $\overline{Sr}^2$; $Sr^3$, $\overline{Sr}^3$; and $Sr^4$, $\overline{Sr}^4$; respectively. Flip-flops $Sr(j)$ are conventional flip-flops having input circuits such that the separate application of pulses to the 1 and 0 input circuits set the corresponding flip-flop to stable states representing 1 and 0, respectively, and the simultaneous application of pulses to both input circuits triggers the flip-flop to change its stable state from its previous state to the opposite state.

In one manner of mechanization, the input signals applied to flip-flops $Sr(1)$, $Sr(2)$, $Sr(3)$, and $Sr(4)$ may be provided according to the following functions:

$$toSr(1)=(Ls+Rs)\cdot Sh^1$$

$$toSr(2)=[Ls\cdot Sh^2+Rs\cdot(Sh^2\cdot\overline{Sh}^1+\overline{Sh}^2\cdot Sh^1)]$$

$$toSr(3)=[Ls\cdot Sh^3+Rs\cdot(Sh^3\cdot Sh^2+Sh^3\cdot\overline{Sh}^1+Sh^4\cdot\overline{Sh}^1)]$$

$$toSr(4)=[Ls\cdot Sh^4+Rs\cdot(\overline{Sh}^3\cdot Sh^2+\overline{Sh}^3\cdot Sh^1+Sh^3\cdot\overline{Sh}^2\cdot\overline{Sh}^1)]$$

where the representation $toSr(j)$ indicates that the corresponding flip-flop is set directly to 1 or 0 according to the corresponding function, $j$ being any of the integers 1, 2, 3, or 4. It will be noted that a function has been introduced for left shift operations (indicated by the signal $Ls$), so that signals $Sh^1$, $Sh^2$, $Sh^3$, and $Sh^4$ are entered directly into corresponding flip-flops.

In the equation set forth in the previous paragraph, the term "$Ls$" represents a signal introduced to the line $Ls$ in Figure 1. This signal may be in the form of a pulse having a particular polarity such as a positive polarity. Similarly, the term "$Rs$" represents a signal introduced to the line $Rs$ in Figure 1 and having characteristics corresponding to the $Ls$ signal. Although the signal $Rs$ and $Ls$ have similar characteristics, they can be distinguished because of their introduction to different lines. These signals may be command signals produced automatically by data processing equipment to obtain shifts in the information in a word or they may be produced as a result of the manual depression of $Rs$ and $Ls$ switches.

The equations set forth two paragraphs above indicate the pattern of operation for flip-flops $Sr(1)$, $Sr(2)$, $Sr(3)$ and $Sr(4)$ as controlled by signals $Sh^1$, $Sh^2$, $Sh^3$ and $Sh^4$. The equations represent a consolidation of the logic controlling the pattern to which the flip-flops should be set for left shift and right shift operations. In accordance with the logic set forth in the previous paragraph, the $Sr(1)$, $Sr(2)$, $Sr(3)$ and $Sr(4)$ flip-flops are triggered only in a single time interval. The flip-flops are triggered to one pattern of operation during a particular time interval for a left shift operation or are triggered to the same or a different pattern of operation during the particular time interval for a right shift operation, depending upon whether a left shift operation or a right shift operation is to be performed.

As will be seen, the triggering of the flip-flops $Sr(1)$, $Sr(2)$, $Sr(3)$ and $Sr(4)$ is represented as $toSr(1)$, $toSr(2)$, $toSr(3)$ and $toSr(4)$. The term $toSr(1)$ indicates that the $Sr(1)$ flip-flop is set to the true state of operation or is maintained in the true state of operation whenever the expression set forth two paragraphs above for $toSr(1)$ is true. The term $toSr(1)$ also indicates that the $Sr(1)$ flip-flop is set to the false state of operation or is maintained in the false state of operation whenever the term on the right side of the equation is false.

In the equation for $toSr(1)$, a signal is produced whenever $(Ls+Rs).Sh^1$ is true. This signal is used to trigger the $Sr(1)$ flip-flop to the true state of operation or to maintain the $Sr(1)$ flip-flop in the true state of operation.

Whenever $(Ls+Rs).Sh^1$ is false at the time of introduction of a clock signal, no signal is produced. Because of the lack of production of a signal at the time of introduction of the clock pulse, a complementer circuit associated with the $Sr(1)$ flip-flop operates to produce a signal. This signal is introduced to the $Sr(1)$ flip-flop to trigger the flip-flop to the false state of operation or to maintain the flip-flop in the false state of operation.

The $Sr(2)$, $Sr(3)$ and $Sr(4)$ flip-flops are controlled in a similar manner to obtain the triggering of the flip-flops to the true or false states of operation. Since the logic set forth above for $toSr(1)$, $toSr(2)$, $toSr(3)$ and $toSr(4)$ may not necessarily be optimum in view of embodiments subsequently to be described, no circuits are set forth in the drawings to illustrate this logic.

A suitable complementer circuit for use in association with each of the flip-flops $Sr(1)$, $Sr(2)$, $Sr(3)$ and $Sr(4)$ is described in copending U. S. patent application Serial No. 308,045 for "Complementary Signal Generating Networks," by D. L. Curtis, filed September 5, 1952.

While a conversion according to the above functions is desirable where it is necessary to enter signals directly into the flip-flop during one binary digit time interval, a simpler mechanization may be provided if several binary digit time intervals are utilized. In this situation it is possible to initially enter signals $Sh^j$ into the corresponding flip-flops $Sr(j)$, and then to change the states of flip-flops $Sr(j)$ during right shift operations ($Rs$) to the desired $n$'s or 12's complement. A three binary digit time operation may be specified by Equations 300–1, defining 1 and 0 input functions for flip-flops $Sr(j)$:

$$300\text{–}1\begin{cases}1Sr(1)=t^2\cdot Sh^1\\ 0Sr(1)=t^1\\ 1Sr(2)=t^3Sh^2+Rs\cdot t^3\cdot Sr^1\\ 0Sr(2)=t^1+Rs\cdot t^3\cdot Sr^1\\ 1Sr(3)=t^2\cdot Sh^3+Rs\cdot t^3\cdot Sr^4\cdot\overline{Sr}^1\\ 0Sr(3)=t^1+Rs\cdot t^3\cdot\overline{Sr}^2\cdot\overline{Sr}^1\\ 1Sr(4)=t^2\cdot Sh^4+Rs\cdot t^3\cdot(\overline{Sr}^3\cdot Sr^2+\overline{Sr}^3\cdot Sr^1+Sr^3\cdot\overline{Sr}^2\cdot\overline{Sr}^1)\\ 0Sr(4)=t^1+Rs\cdot t^3\end{cases}$$

where the signals $t^1$, $t^2$, and $t^3$ respectively indicate first, second, and third binary digit time intervals of operation. These binary digit time intervals may occur any time prior to the shifting operation.

The set of equations defined as 300–1 indicates how the $Sr(1)$, $Sr(2)$, $Sr(3)$ and $Sr(4)$ flip-flops may be triggered in successive time intervals to control left shift and right shift operations. During a first time interval $t^1$, the $Sr(1)$, $Sr(2)$, $Sr(3)$ and $Sr(4)$ flip-flops are reset to their false states of operations so that any previous information in the flip-flops may be eliminated and a new operation may be initiated. During a second digit time interval $t^2$ occurring after the digit time interval $t^1$, the $Sr(1)$, $Sr(2)$, $Sr(3)$ and $Sr(4)$ flip-flops are set to a pattern controlling the amount of shift in a left shift operation. The "$Ls$" term does not have to be included since the inclusion of the term $t^2$ is sufficient to indicate that a left shift is to take place during this time interval. The $Sr(1)$, $Sr(2)$, $Sr(3)$ and $Sr(4)$ flip-flops are then set during a time interval $t^3$ to a pattern of operation controlling a right shift operation. The time interval $t^3$ occurs after the digit time intervals $t^1$ and $t^2$.

As will be seen from the set 300–1 of equations, the flip-flops $Sr(1)$, $Sr(2)$, $Sr(3)$ and $Sr(4)$ are triggered during time $t^2$ in a pattern corresponding to the triggering of the flip-flops for a left shift ($Ls$) operation in the equations $toSr(1)$, $toSr(2)$, $toSr(3)$ and $toSr(4)$ set forth above. However, the logic controlling the triggering of the flip-flops during the time $t^3$ in set 300–1 represents a simplification over the corresponding logic for a right shift ($Rs$) operation in Equations $toSr(1)$, $toSr(2)$, $toSr(3)$ and $toSr(4)$.

As may be seen from Table I, the $Sr(1)$ flip-flop has the same pattern of operation for a right shift operation (represented by $12\text{–}Sh^j$ in Table I) as the pattern of operation of $Sh$ for a left shift operation (represented by $Sh^j$ in Table I). For this reason, the $Sr(1)$ does not have to be triggered during time interval $t^3$ from its previous state of operation during time interval $t^2$.

The logic for the $Sr(2)$ flip-flop during the time interval $t^3$ is also simplified from that set forth above for $toSr(2)$. As may be seen, the logic for $toSr(2)$ has been set forth above as $toSr(2)=Sh^2.\overline{Sh}^1+\overline{Sh}^2.Sh^1$. When the $Sr(2)$ flip-flop is true during the time interval $t^2$, it will remain true during the time interval $t^3$ for a logic expressed as $Sh^2.\overline{Sh}^1$. Since the state of operation of the $Sr(2)$ flip-flop will not change for a logic expressed as $Sh^2.\overline{Sh}^1$, this logic is superfluous. For this reason, the logic for triggering the $Sr(2)$ flip-flop to the true state during the time interval $t^3$ can be simplified to $$1Sr(2)=t^3.\overline{Sh}^2.Sh^1.Rs$$

This can be further simplified since the "$\overline{Sh}^2$" term is superfluous because the $Sr(2)$ flip-flop can only be triggered to the true state when it was previously in the false state. Thus, $1Sr(2)=t^3.Sh^1.Rs$.

As will be seen from Table I, the $Sr(2)$ flip-flop is triggered from the true state for a left shift operation (in representation of $Sh^j$) to the false state for a right shift operation (in representation of $Sr^j$) only when the left shift has decimal values of "3" and "7." For each of these values, the flip-flop $Sr(1)$ is true during the left shift operation. Because of this, the triggering of the $Sr(2)$ flip-flop to the false state of operation can be represented as $oSr(2)=t^3.Rs.Sr^1$.

The triggering of the $Sr(3)$ flip-flop to the true state of operation during the time interval $t^3$ can also be simplified from that expressed previously for $toSr(3)$. This logic is repeated as $$toSr(3)=Sh^3.(Sh^2+Sh^1)+Sh^4.\overline{Sh}^1$$

As will be seen, the logic $Sh^3.(Sh^2+Sh^1)$ is superfluous in the expression for $1Sr(3)$ since this logic indicates that the $Sr(3)$ flip-flop is already in the true state. For this reason, the triggering of the $Sr(3)$ flip-flop during the time interval $t3$ can be expressed as $1Sr(3)=Rs.t^3.Sr^4.\overline{Sr}^1$. As will be seen from Table I, the $Sr(3)$ flip-flop is triggered from a true state of operation for a left shift operation to a false state of operation for a right shift operation only when a shift of 4 positions has been specified for the left shift operation. Such a shift of 4 positions can be represented as $\overline{Sh}^2.\overline{Sh}^1$. For this reason, the logic for triggering the $Sr(3)$ flip-flop to a false state of operation from a true state can be expressed as $$oSr(3)=t^3.Rs.\overline{Sh}^2.\overline{Sh}^1$$

The logic for $1Sr(4)$ during the time interval $t^3$ in the set 300–1 of equations corresponds to the logic set forth previously for $toSr(4)$. Furthermore, as will be seen from Table I, the $Sr(4)$ is triggered false for a right shift operation whenever it was previously true for a left shift operation. For this reason, the logic for triggering the $Sr^3(4)$ flip-flop false during the time interval $t^3$ can be expressed as $oSr(4)=Rs.t^3$.

Figures 1, 3:
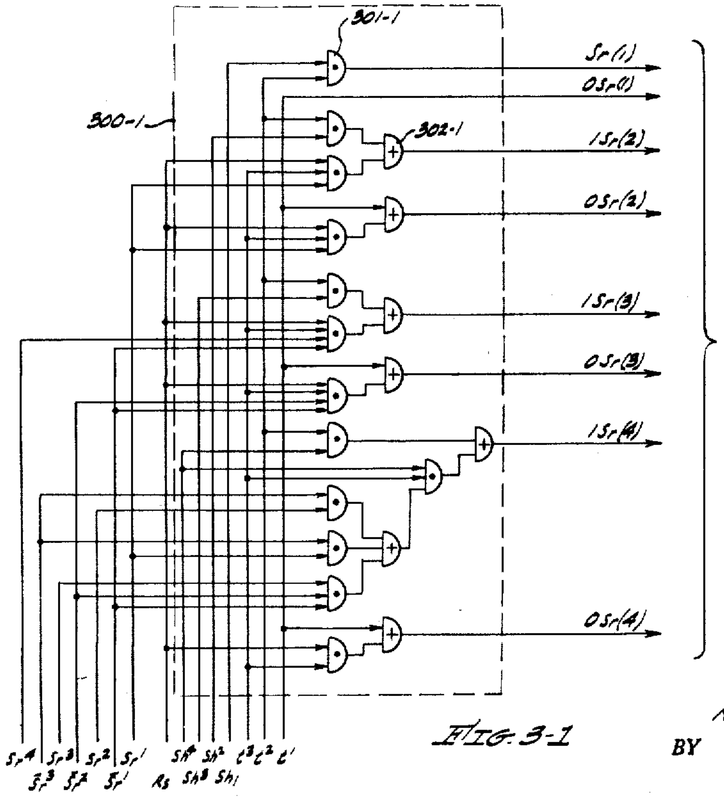

As an illustration of the general form of mechanization according to logical equations, code entry and conversion matrix 300–1 is mechanized according to equation set 300–1 above although it will be understood that many variations in the mechanization functions selected are possible. Referring now to Fig. 3–1, it is noted that each of the "and" functions in the corresponding equations is provided by an "and" circuit which responds to signals applied to separate input terminals and produce a 1-representing output signal when all of the applied signals are 1-representing signals. Thus, "and" circuit 301–1 is mechanized according to the function:

$$t^2.Sh^1$$

and includes 2 input terminals separately receiving signals $t^2$ and $Sh^1$, and produces an output signal having a 1-representing level when the function:

$$t^2.Sh^1=1$$

Each of the "or" functions in the above set of equations is provided by an "or" circuit which receives signals applied to separate input terminals and produces a 1-representing output signal when any one or more of the signals is a 1-representing signal. Thus, "or" circuit 302–1 has two input terminals respectively receiving signals representing the functions $t^2.Sh^2$ and $Rs.t^3.Sr^1$, and produces a 1-representing output signal when either or both of the signals is a 1-representing signal. The manner of mechanization of the other functions should be apparent from this example.

"And" and "or" circuits are now well-known in the computer art and therefore it is not deemed necessary to consider such circuits in detail in this application. Examples of such circuits are shown on pages 37 through 45 of "High-Speed Computing Devices," by Engineering Research Associates, published in 1950 by McGraw-Hill Book Company, Inc., New York and London, and on pages 511 through 514 of an article entitled "Diode Coincidence and Mixing Circuits in Digital Computers" by Tung Chang Chen, in the Proceedings of the Institute of Radio Engineers, volume 38, May 1950.

Signals $Sh^j$ or $Sr^j$ are then translated into a series of control signal pairs $C_0$, $\bar{C}_0$ through $C_{11}$, $\bar{C}_{11}$ as defined in Table II below. No control signal pair $C_{12}$, $\bar{C}_{12}$ is required since it is assumed that a shift of 12 digits corresponds to a 0 shift. The signals $Sh^j$ are translated into the series of control signal pairs $C_0$, $\bar{C}_0$ through $C_{11}$, $\bar{C}_{11}$ for a left shift operation and the signals $Sr^j$ are translated into the series of control signal pairs $C_0$, $\bar{C}_0$ through $C_{11}$, $\bar{C}_{11}$ for a right shift position. As previously described, the signals $Sh^j$ are used to control the patterns of operation of flip-flops $Sr(1)$, $Sr(2)$, $Sr(3)$ and $Sr(4)$ during a first time interval and the signals $Sr^j$ are used to control the pattern of operation of the flip-flops $Sr(1)$, $Sr(2)$, $Sr(3)$ and $Sr(4)$ during a second time interval.

*Table II*

| | $Sr^4$ | $Sr^3$ | $Sr^2$ | $Sr^1$ |
|---|---|---|---|---|
| $C_0$ | 0 | 0 | 0 | 0 |
| $C_1$ | 0 | 0 | 0 | 1 |
| $C_2$ | 0 | 0 | 1 | 0 |
| $C_3$ | 0 | 0 | 1 | 1 |
| $C_4$ | 0 | 1 | 0 | 0 |
| $C_5$ | 0 | 1 | 0 | 1 |
| $C_6$ | 0 | 1 | 1 | 0 |
| $C_7$ | 0 | 1 | 1 | 1 |
| $C_8$ | 1 | 0 | 0 | 0 |
| $C_9$ | 1 | 0 | 0 | 1 |
| $C_{10}$ | 1 | 0 | 1 | 0 |
| $C_{11}$ | 1 | 0 | 1 | 1 |

Suitable functions for providing signals $C_0$ through $C_{11}$ and complementary signals $\bar{C}_0$ through $\bar{C}_{11}$ required for controlling the gating of signals read from heads H3 through H12 may be provided as follows:

$$C_0=\overline{Sr}^4\cdot\overline{Sr}^3\cdot\overline{Sr}^2\cdot\overline{Sr}^1=Sp^0\cdot Sp^1$$
$$\bar{C}_0=Sr^4+Sr^3+Sr^2+Sr^1=\overline{Sp}^0+\overline{Sp}^1$$
$$C_1=\overline{Sr}^4\cdot\overline{Sr}^3\cdot\overline{Sr}^2\cdot Sr^1=Sp^0\cdot Sp^2$$
$$\bar{C}_1=Sr^4+Sr^3+Sr^2+\overline{Sr}^1=\overline{Sp}^0+\overline{Sp}^2$$
$$C_2=\overline{Sr}^4\cdot\overline{Sr}^3\cdot Sr^2\cdot\overline{Sr}^1=Sp^0\cdot Sp^3$$
$$\bar{C}_2=Sr^4+Sr^3+\overline{Sr}^2+Sr^1=\overline{Sp}^0+\overline{Sp}^3$$
$$C_3=\overline{Sr}^4\cdot\overline{Sr}^3\cdot Sr^2\cdot Sr^1=Sp^0\cdot Sp^4$$
$$\bar{C}_3=Sr^4+Sr^3+\overline{Sr}^2+\overline{Sr}^1=\overline{Sp}^0+\overline{Sp}^4$$
$$C_4=Sr^3\cdot\overline{Sr}^2\cdot\overline{Sr}^1=Sr^3\cdot Sp^1$$
$$\bar{C}_4=\overline{Sr}^3+Sr^2+Sr^1=\overline{Sr}^3+\overline{Sp}^1$$
$$C_5=Sr^3\cdot\overline{Sr}^2\cdot Sr^1=Sr^3\cdot Sp^2$$
$$\bar{C}_5=\overline{Sr}^3+Sr^2+\overline{Sr}^1=\overline{Sr}^3+\overline{Sp}^2$$
$$C_6=Sr^3\cdot Sr^2\cdot\overline{Sr}^1=Sr^3\cdot Sp^3$$
$$\bar{C}_6=\overline{Sr}^3+\overline{Sr}^2+Sr^1=\overline{Sr}^3+\overline{Sp}^3$$
$$C_7=Sr^3\cdot Sr^2\cdot Sr^1=Sr^3\cdot Sp^4$$
$$\bar{C}_7=\overline{Sr}^3+\overline{Sr}^2+\overline{Sr}^1=\overline{Sr}^3+\overline{Sp}^4$$
$$C_8=Sr^4\cdot\overline{Sr}^2\cdot\overline{Sr}^1=Sr^4\cdot Sp^1$$
$$\bar{C}_8=\overline{Sr}^4+Sr^3+Sr^1=\overline{Sr}^4+\overline{Sp}^1$$
$$C_9=Sr^4\cdot\overline{Sr}^2\cdot Sr^1=Sr^4\cdot Sp^2$$
$$\bar{C}_9=\overline{Sr}^4+Sr^2+\overline{Sr}^1=\overline{Sr}^4+\overline{Sp}^2$$
$$C_{10}=Sr^4\cdot Sr^2\cdot\overline{Sr}^1=Sr^4\cdot Sp_3$$
$$\bar{C}_{10}=\overline{Sr}^4+\overline{Sr}^2+Sr^1=\overline{Sr}^4+\overline{Sp}^3$$
$$C_{11}=Sr^4\cdot Sr^2\cdot Sr^1=Sr^4\cdot Sp_4$$
$$\bar{C}_{11}=\overline{Sr}^4+\overline{Sr}^2+\overline{Sr}^1=\overline{Sr}^4+\overline{Sp}^4$$

where:

$$Sp^0=\overline{Sr}^4\cdot\overline{Sr}^3$$
$$\overline{Sp}^0=Sr^4+Sr^3$$
$$Sp^1=\overline{Sr}^2\cdot\overline{Sr}^1$$
$$\overline{Sp}^1=Sr^2+Sr^1$$
$$Sp^2=\overline{Sr}^2\cdot Sr^1$$
$$\overline{Sp}^2=Sr^2+\overline{Sr}^1$$
$$Sp^3=Sr^2\cdot\overline{Sr}^1$$
$$\overline{Sp}^3=\overline{Sr}^2+Sr^1$$
$$Sp^4=Sr^2\cdot Sr^1$$
$$\overline{Sp}^4=\overline{Sr}^2+\overline{Sr}^1$$

The general form of mechanization of shift control matrix 500 according to these functions is indicated in Fig. 5. The "and" and "or" circuits required are not shown since a specific illustration of this control matrix is found in the above-mentioned copending application by Michael May et al. Moreover, circuits providing switching according to the above considered functions are well known in the art, reference being made to pages 40 through 43 of "High Speed Computing Devices" wherein suitable forms of matrices for providing switching are described.

Figure 5 shows how various "and" networks and "or" networks are combined to obtain the values of *Co*, $\bar{C}o$ through C11, $\bar{\mathbf{C}}\mathbf{11}$ as set forth above. These values are obtained by introducing the outputs from the flip-flops $Sr(1)$, $Sr(2)$, $Sr(3)$ and $Sr(4)$ on a parallel basis to the input lines shown at the upper left end of Figure 5. These input signals are combined to produce various intermediate signals such as $Sp^0$, $\overline{Sp}^0$ through $Sp^4$, $\overline{Sp}^4$. The intermediate signals are then combined with each other and with the signals from the flip-flops $Sr(1)$, $Sr(2)$, $Sr(3)$ and $Sr(4)$ in various patterns, the combinations being made in "and" or "or" networks shown at the bottom of Figure 5. The "and" or "or" networks shown at the bottom of Figure 5 produce output signals *Co*, $\bar{C}o$ through C11, $\bar{\mathbf{C}}\mathbf{11}$. The control signals $C_0$, $\bar{C}_0$ through $C_{11}$, $\bar{C}_{11}$ indicate the various positions in a word and serve to distinguish the various positions from one another. Since the various positions can also be represented by the different patterns of operation of the flip-flops $Sr(1)$, $Sr(2)$, $Sr(3)$ and $Sr(4)$, the signals from these flip-flops can be combined in various patterns to produce the control signals. It will be seen that certain of the control signals set forth above indicate the occurrence of a particular position and that other of the control signals indicate the occurrence of any position other than the particular position. For example, the signal $C_3$ indicates the fourth position in a word and the signal $\bar{C}_4$ indicates the occurrence of any position except the fifth position.

The production of the $C_3$ control signal will now be described in detail to serve as an example for the production of the various control signals. As will be seen from the logic set forth above and from Figure 5, a signal passes through the "and" network designated as $Sp^4$ upon the simultaneous introduction of signals of high amplitude to represent the true state of operations of the flip-flops $Sr(1)$ and $Sr(2)$. Similarly, a signal passes through the "and" network designated as $Sp^0$ when signals of high amplitude are simultaneously introduced to the "and" network from the flip-flops $Sr(3)$ and $Sr(4)$ to indicate the false states of operation of these flip-flops. The signals from the "and" networks designated as $Sp^0$ and $Sp^4$ are introduced to an "and" network 101 in Figure 5. The "and" network 101 passes a signal designated as $C_3$ when relatively high voltages are simultaneously introduced to it from the "and" networks designated as $Sp^0$ and $Sp^4$.

Control signals $C_0$, $\bar{C}_0$ through $C_{11}$, $\bar{C}_{11}$ are applied to gating matrix 600 and respectively control the selective reading of signals $R_0$ through $R_{11}$, $R_{12}$ being selected during zero right shift under the control of signals $C_0$ and $\bar{C}_0$. A complete set of output signals corresponding to selected signals may be specified by the function:

$$O_k=R_k.C_k$$

indicating that gating matrix 600 requires only a single gating function for producing each output signal series.

In order to illustrate a specific mechanization of gating matrix 600 it is assumed that the embodiment of Fig. 1 includes two delay sections D1 and D2 and heads H3 through H12. Thus signals $R_0$, $R_1$, and $R_2$ respectively correspond to input signal I. Signals $D_1$ and $D_2$ are produced by delay sections D1 and D2. Signals $H_3$ through $H_{12}$ correspond respectively to signals $R_3$ through $R_{12}$. Thus, the set of output signals $O_k$ may be specifically defined as follows:

$O_0=I.C_0$
$O_1=D_1.C_1$
$O_2=D_2.C_2$
$O_3=H_3.C_3$
$O_4=H_4.C_4$
$O_5=H_5.C_5$
$O_6=H_6.C_6$
$O_7=H_7.C_7$
$O_8=H_8.C_8$
$O_9=H_9.C_9$
$O_{10}=H_{10}.C_{10}$
$O_{11}=H_{11}.C_{11}$
$O_{12}=H_{12}.C_0$

The signals $O_0$ and $O_1$ to $O_{12}$ inclusive, represent the output signals from the system constituting the invention. At any one time, only one of the signals $O_1$ to $O_{12}$, inclusive, is produced. For example, an output signal $O_6$ may be produced from the head $H_6$ when a control signal $C_6$ is produced by the matrix network shown in Figure 5 to indicate that the 7th position in the word has been selected. Similarly, an output signal $O_2$ may be produced by the delay signal D2 when a control signal $C_2$ is produced to indicate the selection of a third position in the word.

The general form of gating matrix 600 for providing output signals $O_k$ according to these functions is indicated in Fig. 6. As shown in Fig. 6 output signals $O_0$, $O_1$, and $O_2$ are produced in conventional "and" circuits 610–0, 610–1, and 610–2, respectively. Signals corresponding to output signals $O_3$ through $O_{12}$ are produced as a function of drum signals $H_3$ through $H_{12}$ which are gated through diode bridge circuits 620–3 through 620–12, respectively; a suitable form for the diode bridge circuits 620 being illustrated in circuit 620–3. As indicated in circuit 620–3 each of the diode bridge circuits has an input terminal 621, control terminals 622 and 623 and an output terminal 624. Each of the diode gating circuits 620 is controlled by a corresponding complementary pair of control signals. Thus, gating circuit 620–3 is controlled by control signals $C_3$ and $\bar{C}_3$ applied to control terminals 622–3 and 623–3, respectively.

As illustrated in circuit 620–3, each of the diode circuits includes first and second gating resistors 625 and 626 respectively coupling control terminals 622 and 623 to diode bridge points 627 and 628. Bridge points 627 and 628 are respectively coupled to input terminal 621 through diodes 629 and 630. The diodes are selected to have equal impedance characteristics and are connected so that all diodes are forward biased when the corresponding control signal C is a high-level signal and $\bar{C}$ is a low-level signal and are back biased when signal C is a low-level signal and $\bar{C}$ is a high-level signal. As an illustration of suitable operating conditions, terminals 621 are shown as being biased at −7.5 volts through head reading transformers 650 and the gating signals are assumed to vary between 0 volt representing binary 1, and −15 volts representing binary 0. With the given combination of gating and bias voltages no gating signal appears at output terminal 624.

When the diodes in a bridge circuit are forward biased the signal applied to input terminal 621 is effectively gated through the bridge circuit to output terminal 624, whereas when the diodes are back biased the bridge is effectively open circuited and no signal passes through.

Signals $O_0$, $O_1$, $O_2$ and signals $H_3$ through $H_{12}$ are combined in output circuit 700 which includes the amplification stages necessary to produce a complete set of signals $O_k$. As indicated above a suitable form of output circuit 700 is described in the above-mentioned copending application No. 359,212 by Michael May et al.

As previously indicated, the embodiment of Fig. 1 may be utilized to perform an inversion operation in $2n$ digit time intervals, signal series I being re-applied to input circuit 200 during the second set of $n$ digit time intervals. During the inversion operation output signals $O_k$ represent signals $I_n \ldots I_{n-i+1} \ldots I_1$ during time intervals $T_1 \ldots T_i \ldots T_n$, respectively. This is expressed logically by the equation:

$$O_k=T_1.I_n+\ldots T_i.I_{n-i+1}+\ldots T_n.I_1$$

where the variables $T_i$ are considered to be binary time variables having 1-representing levels only during the corresponding time interval. Thus, during each time interval $T_i$, signal $O_k$ is equal to signal $I_{n-i+1}$. The logical equation for $O_k$ set forth above indicates that only one of the input signals I can be introduced as an output signal during any particular time interval. The expresison further indicates that the particular input signal produced as the output signal is dependent upon the time interval $T_i$ chosen.

The above equation may also be written in the following manner:

$$O_k=T_1.I_n+\ldots T_i.I_{n-i+1}+\ldots T_{n/2}.I_{n/2+1}+ T_{n/2+1}.I_{n/2}+\ldots T_{n/2+i}.I_{n/2-i+1}\ldots T_n.I_1$$

where the series $O_k$ is effectively divided into two groups, one including the signals $I_n \ldots I_{n/2+1}$ and the other including signals $I_{n/2} \ldots I_1$. The relationship between the equation for $O_k$ set forth in the previous sentence and the equation for $O_k$ set forth in the previous paragraph may be seen by substituting particular values for $i$ and $n$ in the equations. For example, $n$ may be equal to 12 in conformance with the previous discussion and $i=6$ in the equation set forth in the previous paragraph. For such values, $O_k=T_6.I_7$. Similarly, the value of $O_k$ in the equation set forth in this paragraph is obtained as $T_6$. $I_7$ by proper substitution of $n=12$ in the relationship $O_k=T_{n/2}.I_{n/2}+1$. Similarly, when $i=8$ in the expression for $O_k$ set forth in the previous paragraph, $O_k=T_8.I_5$. A value of $i=8$ in the expression for $O_k$ set forth in the previous paragraph is equivalent to a value of $i=2$ in the expression for $O_k$ set forth in this paragraph. Thus $$O_k=T_{n/2+i}.I_{n/2-i+1}=T_{12/2+2}.I_{12/2-2+1}=T_8.I_5$$

It will thus be seen that in the expresison for $O_k$ set forth in this paragraph, $i$ varies between 1 and 6 where the value of I is designated as $n-i+1$. The value of $i$ again varies between the values of "1" and "6" in the expression for $O_k$ in this paragraph when $T_i$ has the value of $n_{/2+i}$ and I has the value of $n_{/2-i+1}$. The signals of the first group may be obtained as a function of the first set of input signals I shown in Fig. 2, where it will be recalled the signal $R_k=I_{n-k+i}$, during each time interval $T_i$. In order to provide the desired sequence, then, signals $I_{n-i+1}$ must be equivalent to $I_{n-k+i}$. This provides the relationship:

$$n-k+i=n-i+1$$
$$k=2i-1$$

The value of $k=2i-1$ is obtained by comparing the value of $I_{n-i+1}$ in the equation for $O_k$ with the value of $I_{n-k+i}$ in the equation $R_k=I_{n-k+i}$ set forth some paragraphs above. The value of $I_{n-1+i}$ and $I_{n-i+1}$ may be set equal to each other since both occur during the time interval $T_i$.

The second group of signals $O_k$ may be obtained as a function of the second set of input signals I where signal $R_k=I_i$ during the time interval $T_{k+i}$ as explained above. It will be noted, then, that signal $R_1$ represents signal $I_{n/2}$ of the second set during the time interval $T_{n/2+1}$ and that signal $R_{n-1}$ represents signal $I_1$ during the time interval $T_n$. These relationships may be established by substituting in the proper variables in the definition of signal R during the reading of the second set of input signals. It is apparent, then, that signal $R_{2i-1}$ not only corresponds to any of the signals of the first group but also corresponds to signal $I_{n/2-i+1}$ during time interval $T_{n/2+1}$ as is required for output signals $O_k$ of the second group. This may be established as follows:

$$R_k=I_i.T_{k+i}$$
$$R_{2i-1}=I_{n/2-i+1}.T_{(2i-1)+[n/2-i+1]}$$
$$=I_{n/2-i+1}.T_{n/2+i}$$

The equation set forth immediately above for $R_{2i-1}$ is obtained by providing a value of $i={}_{n/2-i+1}$ and a value of $K=2i-1$ in the equation $R_k=I_i.T_{k+i}$. The value of $K=2_{i-1}$ is obtained from the previous paragraph and the value of $i={}_{n/2-i+1}$ is obtained from the relationship for $O_k$ set forth in the previous paragraph. This may be seen from the fact that one of the terms in the equation for $O_k$ is $$O_k=T_{n/2+i}.I_{n/2-i+1}$$

Signal $O_k$ therefore may be represented as follows:

$$O_k=T_1.R_1+ \ldots T_i.R_{2i-1}+ \ldots T_{n/2}.R_{n-1}+ T_{n/2+1}.R_1 \ldots T_{n/2+i}.R_{2i-1} \ldots .T_n.R_{n-1}$$

The term $T_i.R_{2i-1}$ in the equation for $O_k$ in the previous paragraph is obtained from the term $T_i.I_{n-i+1}$ in the equation previously set forth for $O_k$. The term is obtained by substituting the value $K=2i-1$ in the equation $R_k=I_{n-k+i}$ (occurring during any time interval $T_i$), the equation for $R_k$ having been previously set forth above. Similarly, the term $T_{n/2}.R_{n-1}$ in the equation for $O_k$ set forth immediately above is obtained from the term $T_i.R_{2i-1}$ in the equation for $O_k$, the derivation of this latter term having just been described. The term $T_{n/2}.R_{n-1}$ is obtained by substituting a value of $$i=\frac{n}{2}$$

in the value of $T_i.R_{2i-1}$.

The term $T_{n/2+i}.I_{n/2-i+1}$ in the equation previously set forth for $O_k$ becomes $T_{n/2+i}.R_{2i-1}$ by substituting $R_{2i-1}$ for $I_{n/2-i+1}$. The term $T_{n/2+1}.R_1$ in the equation for $O_k$ is obtained by substituting the value $i=1$ in the term $T_{n/2+i}.R_{2i-1}$. Similarly, the term $T_n.R_{n-1}$ in the equation for $O_k$ two paragraphs above is obtained by substituting a value of $i=n/2$ in the term $T_{n/2+i}.R_{2i-1}$.

In order to illustrate specific structure for performing inversion in this manner, it will be assumed again that $n$ is equal to 12 so that signal series $O_k$ may be represented as follows:

$$O_k=T_1.R_1+T_2.R_3+T_3.R_5+T_4.R_7+T_5.R_9+ T_6R_{11}+T_7.R_1+T_8.R_3+T_9.R_5+ T_{10}.R_7+T_{11}.R_9+T_{12}.R_{11}$$

The equation for $O_k$ set forth at the end of the previous paragraph may be seen on a practical basis from the following discussion. Since the signals $I_1 \ldots I_n$ are being inverted in order, the signal $I_n$ must be recorded first. At the time that the signal $I_n$ is presented to the delay line $D_1$, all of the other signals $I_1 \ldots I_{n-1}$ have been presented to the delay line $D_2$ and the heads $H_3$ through $H_{12}$.

For example, the signal $I_{n-1}$ is the delay line $D_2$ at the time that the signal $I_n$ is being presented to the delay line $D_1$. When the signal $I_n$ is presented to the delay line $D_1$, the signal is passed for recording. This is indicated by the term $T_1.R_1$ in the equation for $O_k$ set forth two equations above. During the time that the signal $I_n$ is being recorded, the signal $I_{n-1}$ is advancing from the delay line $D_2$ to the head $H_3$. For this reason, the signal $I_{n-1}$ is passed by the head $H_3$ during a second time interval to obtain a recording of the signal. This is indicated by the term $T_2.R_3$ in the equation for $O_k$ set forth two paragraphs above. $I_{n-2}$ is advancing from the head $H_4$ to the head $H_5$. For this reason, the signal $I_{n-2}$ passes through the head $H_5$ for recording. This is indicated by the term $T_3.H_5$ in the equation for $O_k$ set forth two paragraphs above.

As will be seen from the previous discussion, signals are passed only by alternate heads for recording. This causes only the six signals $I_n \ldots I_{n-5}$ to be passed by the delay lines $D_1$ and $D_2$ and the heads $H_3$ to $H_{12}$, inclusive, for recording during the first time that the signals $I_1 \ldots I_n$ are passed sequentially through the heads. For this reason, the signals have to be passed a second time through the delay lines $D_1$ and $D_2$ and the heads $H_3$ to $H_{12}$, inclusive, so that the signals $I_1$ to $I_6$, inclusive, can be recorded in inverse order. The recording of the signals $I_1$ to $I_6$, inclusive, in inverse order during the second pass is accomplished in a manner similar to the recording of the signals $I_{n-5}$ to $I_n$, inclusive, in inverse order during the first pass.

With signals $C_k$ defined in a conventional binary representation, the necessary sequence of signals $Sr^j$ required for obtaining the desired selections of signals $O_k$ is indicated in Table II below:

*Table II*

| $C_k$ | $Sr^4$ | $Sr^3$ | $Sr^2$ | $Sr^1$ | $T_i$ | |
|---|---|---|---|---|---|---|
| 1 | 0 | 0 | 0 | 1 | 1 | 7 |
| 3 | 0 | 0 | 1 | 1 | 2 | 8 |
| 5 | 0 | 1 | 0 | 1 | 3 | 9 |
| 7 | 0 | 1 | 1 | 1 | 4 | 10 |
| 9 | 1 | 0 | 0 | 1 | 5 | 11 |
| 11 | 1 | 0 | 1 | 1 | 6 | 12 |

Table II is obtained primarily from the equation for $O_k$ set forth in the previous paragraph. The first vertical column in Table II (designated as $C_k$) indicates the particular gating position to be activated. This corresponds to the activation of a particular one of the heads $R_k$ as may be seen from the equation $O_k=R_k.C_k$ set forth above. The vertical columns designated $Sr^4$, $Sr^3$, $Sr^2$ and $Sr^1$ indicate the pattern of operation of the $Sr(4)$, $Sr(3)$, $Sr(2)$ $Sr(1)$ flip-flops required to obtain the value of $C_k$ in the first vertical column of Table II. The last two vertical columns of Table II (designated as $T_i$) indicate the particular times at which the gating positions designated as $C_k$ become activated. The relationship between $T_i$ and $C_k$ is obtained from the equation for $O_k$ set forth in the previous paragraph.

The conversion functions to provide this sequence may be specified as follows:

$$1Sr(1)=0Sr(1)=0$$
$$1Sr(2)=0Sr(2)=t^i$$
$$1Sr(3)=\overline{Sr^4}.Sr^2.t^i$$
$$0Sr(3)=Sr^2.t^i$$
$$1Sr(4)=Sr^3.Sr^2.t^i$$
$$0Sr(4)=Sr^2.t^i$$

where the signal $t^i$ is introduced to represent a digit timing pulse occurring at the beginning of each timing interval $T_i$.

The equations set forth in the previous paragraph are derived from the relationships shown in Table II. For example, it will be seen that the $Sr(1)$ flip-flop is always in the true state. For this reason, the $Sr(1)$ flip-flop does not have to be triggered true and cannot be triggered false. This is indicated by the equations $$1Sr(1)=0Sr(1)=0$$

The $Sr(2)$ flip-flop is alternately triggered false and true during successive time intervals as may be seen in Table II. Because of this, the logic for the $Sr(2)$ flip-flop may be written as $1Sr(2)=0Sr(2)=t^i$. This indicates that the $Sr(2)$ flip-flop is triggered from one state to the other upon the occurrence of each clock pulse. As may be seen from Table II, the $Sr(3)$ flip-flop is triggered true when the value of $C_k$ changes from "3" to "5." A value of "3" for $C_k$ may be indicated logically as $\overline{Sr^4}.Sr^2$ such that $1Sr(3)=\overline{Sr^4}.Sr_2.t^i$. The $Sr(3)$ flip-flop again becomes triggered false when $C_k$ changes from a value of "7" to a value of "9." The logic indicating a value of "7" for $C_k$ may be simplified to $Sr^2$ to obtain the proper triggering of the $Sr(3)$ flip-flop to the false state. The logic may be simplified to $0Sr(3)=Sr^2.t^i$ since the $Sr(3)$ is either triggered false or remains false upon the occurrence of such a logic.

The $Sr(4)$ flip-flop is triggered true when the value of $C_k$ changes from "7" to "9" in Table II. In order to distinguish the value of "7" for $C_k$ sufficiently from the other values, the logic for $C_k$ must be expanded to $Sr^3.Sr^2$ such that $1Sr(4)=Sr^3.Sr^2.t^i$. By including $Sr$ in the logic, a value of "7" for $C_k$ becomes distinguished from values of "3" and "9" for $C_k$. The $Sr(4)$ flip-flop is triggered false when the value of $C_k$ changes from "11" to "1" in Table II. For purposes of triggering the $Sr(4)$ flip-flop to the false state, the logic of $C_k$ for a value of "11" may be set forth as $Sr^2$. This logic is sufficient since the $Sr(4)$ flip-flop is either triggered false or remains false upon each occurrence of logic designated as $Sr^2.t^i$.

In order to initiate the conversion it is necessary to set flip-flop $Sr(1)$ to 1 and flip-flops $Sr(2)$, $Sr(3)$, and $Sr(4)$ to 0, so that control signal $C_1$ has a 1-representing level during time interval $T_1$. With the introduction, then, of a reset operation, assumed to be made in response to timing pulse $t^3$ utilized in right shift conversions above, the inversion functions then appear as follows:

$$1Sr(1)=V\cdot t^3$$
$$0Sr(1)=0$$
$$1Sr(2)=V\cdot t^i$$
$$0Sr(2)=V\cdot(t^3+t^i)$$
$$1Sr(3)=V\cdot\overline{Sr}^4\cdot Sr^2\cdot t^i$$
$$0Sr(3)=V\cdot(t^3+Sr^2\cdot t^i)$$
$$1Sr(4)=V\cdot Sr^3\cdot Sr^2\cdot t^i$$
$$0Sr(4)=V\cdot(t^3+Sr^2\cdot t^i)$$

The equations set forth in the previous paragraph are similar to the equations immediately following Table II except for the inclusion of logic for resetting the $Sr(1)$, $Sr(2)$, $Sr(3)$ and $Sr(4)$ flip-flops to a value of "1" for $C_k$ after the inversion operation. This resetting operation occurs during a time interval $t^3$. As may be seen from Table II, the $Sr(1)$ flip-flop is reset to a true state and the $Sr(2)$, $Sr(3)$ and $Sr(4)$ flip-flops are reset to false states for a value of "1" for $C_k$. A new inversion operation can then be instituted during the time intervals $t^i$ where the intervals $t^i$ are assumed to follow the timing interval $t^3$.

Equations 300–1 defining right and left shift conversions may now be modified to introduce the inversion operation just described. The combined functions are indicated as equation set 300–2 below; the mechanization of entry and conversion matrix 300 according to these equations being illustrated in Fig. 3–2.

$$(300\text{–}2)\begin{cases}1Sr(1)=t^2\cdot Sh^1+V\cdot t^3\\ 0Sr(1)=t^1\\ 1Sr(2)=t^2\cdot Sh^2+Rs\cdot t^3\cdot Sr^1+V\cdot t^i\\ 0Sr(2)=t^1+t^3\cdot(V+Rs\cdot Sr^1)+V\cdot t^i\\ 1Sr(3)=t^2\cdot Sh^3+Rs\cdot t^3\cdot Sr^4\cdot\overline{Sr}^1+V\cdot\overline{Sr}^4Sr^2\cdot t^i\\ 0Sr(3)=t^1+t^3\cdot(V+Rs\cdot\overline{Sr}^2\cdot\overline{Sr}^1)+V\cdot Sr^2\cdot t^i\\ 1Sr(4)=t^2\cdot Sh^4+Rs\cdot t^3\cdot(\overline{Sr}^3\cdot Sr^2+\overline{Sr}^3\cdot Sr^1+\\ \qquad Sr^3\cdot\overline{Sr}^2\cdot\overline{Sr}^1)+V\cdot Sr^3\cdot Sr^2\cdot t^i\\ 0Sr(4)=t^1+t^3\cdot(V+Rs)+V\cdot Sr^2\cdot t^i\end{cases}$$

The set 300–2 of equations is obtained by combining the set of equations set forth in the previous paragraph with the set 300–1 of equations set forth previously.

In many applications it is desirable to be able to continuously invert a series of sequentially applied group of input signals I. In this situation it is necessary to perform inversion in $n$ digit time intervals. Such an inversion is specified by the output signal series $O_k$ as follows:

$$O_k=T_1.I_n+\ \ldots\ T_i.I_{n-i+1}+\ \ldots\ T_n.I_1$$

As indicated above, signal $R_{2i-1}$ corresponds to $I_{n-i+1}$ of the first set during time interval $T_1$, providing the equation:

$$O_k=T_1.R_1+\ \ldots\ T_i.R_{2i-1}\ \ldots\ T_n.R_{2n-1}$$

A circuit for performing inversion in this manner is shown in Fig. 1*a*, wherein heads $Hm+1$ . . . $Hn$ . . . $H2i-1$ . . . $H2n-1$ are included; heads $Hm+1$ through $Hn$ being utilized in both shifting and inversion operations and heads $Hn+1$ through $H2n-1$ being required as additional circuits for performing inversion in $2n$ digit time intervals. In the operation of this circuit an additional $n$ digit time interval is required to enter signals I onto drum 100. Thus, the inversion of X groups of signal series I requires a total of $ni(X+1)$ digit time intervals.

In order to describe specific mechanization equations for performing an $n$ digit time inversion, it will be assumed again that $n$ is equal to 12 so that signal series $O_k$ may be represented as follows:

$$O_k=T_1.R_1+T_2.R_3+T_3.R_5+T_4.R_7+T_5.R_9+T_6.R_{11}+$$
$$T_7.R_{13}+T_8.R_{15}+T_9.R_{17}+T_{10}.R_{19}+T_{11}.R_{21}+T_{12}.R_{23}$$

The equation for $O_k$ set forth in the previous paragraph may be seen on a practical basis from the following discussion. The first half of the equation corresponds to the equation for $O_k$ set forth immediately before Table II. Since the number of heads in this embodiment has been increased by a value of $H_n$, the signals $I_1$ to $I_6$, inclusive, can be inverted during the time that the signals are passing through the additional plurality of $H_n$ heads. For this reason, the additional plurality of $H_n$ heads performs a function similar to that performed by the $D_1$ and $D_2$ delay lines and the $H_3$ and $H_{12}$ heads during the second pass of the signals in the previous embodiment.

One manner of defining signals $C_k$, where again signals $Sr^j$ are binary signals, is indicated in Table III below.

*Table III*

| $C_k$ | $Sr^4$ | $Sr^3$ | $Sr^2$ | $Sr^1$ | $T_i$ |
|---|---|---|---|---|---|
| 1 | 0 | 0 | 0 | 1 | 1 |
| 3 | 0 | 0 | 1 | 1 | 2 |
| 5 | 0 | 1 | 0 | 1 | 3 |
| 7 | 0 | 1 | 1 | 1 | 4 |
| 9 | 1 | 0 | 0 | 1 | 5 |
| 11 | 1 | 0 | 1 | 1 | 6 |
| 0 | 0 | 0 | 0 | 0 | 7 |
| 2 | 0 | 0 | 1 | 0 | 8 |
| 4 | 0 | 1 | 0 | 0 | 9 |
| 6 | 0 | 1 | 1 | 0 | 10 |
| 8 | 1 | 0 | 0 | 0 | 11 |
| 10 | 1 | 0 | 1 | 0 | 12 |

As indicated in Table III control signals $C_0$, $C_2$, $C_4$, $C_6$, $C_8$, and $C_{10}$ are utilized to control the inversion selection during time intervals $T_7$, $T_8$, $T_9$, $T_{10}$, $T_{11}$, and $T_{12}$, respectively. The designation of the signals as $C_0$, $C_2$, $C_4$, $C_6$, $C_8$ and $C_{10}$ is arbitrary. Actually these signals could also have been designated as $C_{13}$, $C_{15}$, $C_{17}$, $C_{19}$, $C_{21}$ and $C_{23}$ to correspond with the subscripts for R in the equation for $O_k$ set forth immediately before Table III. For example, a control signal $C_k$ would have had to be used to obtain the signal $R_{13}$ in the equation for $O_k$ set forth in the previous paragraph. The controlling signals of $C_0$, $C_2$, $C_4$, $C_6$, $C_8$ and $C_{10}$ are used in order to minimize the amount of circuitry required. This results from the fact that the control signals $C_0$, $C_2$, $C_4$, $C_6$, $C_8$ and $C_{10}$ are used during the right and left shift operations but would not ordinarily be available for use during the inversion operation. If the control signals $C_0$, $C_2$, $C_4$, $C_6$, $C_8$ and $C_{10}$ were not used during the inversion operation, additional control signals $C_{13}$, $C_{15}$, $C_{17}$, $C_{19}$, $C_{21}$ and $C_{23}$ would have to be provided. Since the control signals $C_0$, $C_2$, $C_4$, $C_6$, $C_8$ and $C_{10}$ are also utilized in right and left shift operations it is necessary to separate the inversion and shifting selections in gating matrix 600. This may be achieved with the introduction of signal $\bar{V}$, during right and left shift selections, and signal V during inversion selections.

A complete set of output signals $O_k$ may now be defined wherein signals $\bar{V}$ and V are introduced to provide the necessary restrictions as discussed above. These functions appear as follows:

$O_0=I.C_0$
$O_1=D_1.C_1$
$O_2=\bar{V}.D_2.C_2$
$O_3=H_3.C_3$
$O_4=\bar{V}.H_4.C_4$
$O_5=H_5.C_5$
$O_6=\bar{V}.H_6.C_6$
$O_7=H_7.C_7$
$O_8=\bar{V}.H_8.C_8$
$O_9=H_9.C_9$
$O_{10}=\bar{V}.H_{10}.C_{10}$
$O_{11}=H_{11}.C_{11}$
$O_{12}=\bar{V}.H_{12}.C_0$
$O_{13}=V.H_{13}.C_0$
$O_{15}=V.H_{15}.C_2$
$O_{17}=V.H_{17}.C_4$
$O_{19}=V.H_{19}.C_6$
$O_{21}=V.H_{21}.C_8$
$O_{23}=V.H_{23}.C_{10}$ As will be seen, the signals $O_2$, $O_4$, $O_6$, $O_8$, $O_{10}$ and $O_{12}$ can occur only during right shift operations or left shift operations because of the inclusion of the signal V. The signals $O_{13}$, $O_{15}$, $O_{17}$, $O_{19}$, $O_{21}$ and $O_{23}$ can occur only during inversion operations because of the signal $\bar{V}$. In this way, the use of the signals $C_0$, $C_2$, $C_4$, $C_6$, $C_8$ and $C_{10}$ in conjunction with delay line $D_2$ and the heads $H_4$, $H_6$, $H_8$, $H_{10}$ and $H_{12}$ can be distinguished from the use of the signals in conjunction with the heads $H_{13}$, $H_{15}$, $H_{17}$, $H_{19}$, $H_{21}$ and $H_{23}$. Since the signals $C_1$, $C_3$, $C_5$, $C_7$, $C_9$ and $C_{11}$ are used in conjunction with the heads $H_1$, $H_3$, $H_5$, $H_7$, $H_9$ and $H_{11}$ for right and left shift operations and for inversion operations, no distinction has to be provided by the signals V and $\bar{V}$ to obtain the output signals $C_1$, $C_3$, $C_5$, $C_7$, $C_9$ and $C_{11}$.

The mechanization of gating matrix 600 according to the Equations $O_1$ to $O_{23}$, inclusive, two paragraphs above is illustrated in Fig. 6*a* where again diode bridge circuits 620 are utilized to provide the necessary switching of magnetic drum head signals. The mechanization of gating matrix 600 to provide this switching should be apparent from the previously considered example.

From Table III the conversion and reset functions for providing the desired sequence of control signals $C_k$ may be expressed as follows:

$$1Sr(1)=V\cdot t^3$$
$$0Sr(1)=V\cdot t^i\cdot\overline{Sr}^3\cdot Sr^2\cdot Sr^1$$
$$1Sr(2)=V\cdot t^i$$
$$0Sr(2)=V\cdot(t^3+t^i)$$
$$1Sr(3)=V\cdot\overline{Sr}^4\cdot Sr^2\cdot t^i$$
$$0Sr(3)=V\cdot(t^3+Sr^2\cdot t^i)$$
$$1Sr(4)=V\cdot Sr^3\cdot Sr^2\cdot t^i$$
$$0Sr(4)=V\cdot(t^3+Sr^2\cdot t^i)$$

It is believed that the derivation of these equations from Table III will be understood from the previous discussion and especially from the discussion relating to the derivation of corresponding equations from Table II.

Equations 300–1 defining right and left shift conversions may now be modified to represent the *n* digit time inversion just described. Equations 300–1 may be modified by combining them with the equations set forth in the previous paragraph. The combined functions are indicated as equation set 300*a* below; the mechanization of entry and conversion matrix 300 according to these equations being illustrated in Fig. 3*a*.

$$(300a)\begin{cases}1Sr(1)=t^2\cdot Sh^1+V\cdot t^3\\0Sr(1)=t^1+V\cdot\overline{Sr}^3\cdot Sr^2\cdot Sr^1\cdot t^i\\1Sr(2)=t^2\cdot Sh^2+Rs\cdot t^3\cdot Sr^1+V\cdot t^i\\0Sr(2)=t^1+t^3\cdot(V+Rs\cdot Sr^1)+V\cdot t^i\\1Sr(3)=t^2\cdot Sh^3+Rs\cdot t^3\cdot Sr^4\cdot\overline{Sr}^1+V\cdot\overline{Sr}^4\cdot Sr^2\cdot t^i\\0Sr(3)=t^1+t^3\cdot(V+Rs\cdot\overline{Sr}^2\cdot\overline{Sr}^1)+V\cdot Sr^2\cdot t^i\\1Sr(4)=t^2\cdot Sh^4+Rs\cdot t^3\cdot(\overline{Sr}^3\cdot Sr^2+\overline{Sr}^3\cdot Sr^1+\\\quad Sr^3\cdot\overline{Sr}^2\cdot\overline{Sr}^1)+V\cdot Sr^3\cdot Sr^2\cdot t^i\\0Sr(4)=t^1+t^3\cdot(V+Rs)+V\cdot Sr^2\cdot t^i\end{cases}$$

From the foregoing description it is apparent that the present invention provides electronic circuits for selectively shifting or inverting the time position of digital data wherein the shifting circuit elements may be utilized as well for inverting, the circuit combination thereby requiring a minimum of additional circuit elements. While in the specific circuits described in detail the shift or inversion selections are made through an output gating matrix, it will be understood that selections may as well be performed through an input gating matrix, performing a similar function. In its generic form then, the gating matrix of the present invention is defined as a means for applying the input signals through certain of the delay circuits to an output circuit, without specifying whether an input or an output matrix is utilized.

While a few specific mechanizations have been illustrated it will be understood that the invention is not so limited but may assume a multitude of different forms. For example, in the place of the parallel conversion technique utilized in matrix 300 a serial conversion may be introduced wherein shift selection signals are entered serially and converted during entry. In addition, many other forms of shift control matrix 500 and gating matrix 600 may be utilized.

While the invention is described mainly as a circuit which may be utilized for any of the operations of right shift, left shift, or inversion it will be understood that the subcombinations of separate shifting or inverting circuits are contemplated as well.

The operation of the circuit shown in Fig. 1*a*, in performing an *n* digit time interval conversion, is illustrated in Fig. 2*a* where the signals $R_1$, $R_3$ . . . $R_{2i-1}$ . . . $R_{2n-3}$, and $R_{2n-1}$ are utilized as ordinant variables and input signals $I_1$ . . . $I_n$ previously entered into drum 100 provide abscissa variables. As indicated in Fig. 2*a*, signals $R_1$, $R_3$ . . . $R_{2i-1}$ . . . $R_{2n-3}$, and $R_{2n-1}$ correspond to input signals $I_n$, $I_{n-i}$ . . . $I_{n-i+1}$ . . . $I_2$, and $I_1$, during digit time intervals $T_1$, $T_2$ . . . $T_i$ . . . $T_{n-1}$, and $T_n$, respectively.

What is claimed as new is:

1. A shifting and inverting circuit selectively operable, in response to first, second, and third control signals, respectively, to shift right, shift left, and invert the time position of a series of *n* input signals representing a corresponding series of digits, the amount of the shifting being specified by an applied set of coded shift selection signals; said shifting and inverting circuit comprising: signal conversion means responsive to the first control signal for producing a first set of converted signals representing said amount of shifting, responsive to the second control signal for producing a second set of converted signals representing the *n*'s complement of said amount of shifting, and responsive to the third control signal for producing a series of third sets of converted signals, one for each of the input signals; shift control means responsive to each set of converted signals for producing shift control signals, said shift control signals representing the amount specified by the corresponding set of converted signals; shifting means, including $n$ delay circuits, responsive to said input signals for reproducing said input signals after successively increased delays; and a gating matrix, responsive to each shift control signal and the delayed input signals selectively providing delayed input signals as output.

2. An electronic circuit for selectively shifting the time position of a series of $n$ input signals representing a corresponding series of digits, the amount and direction of the shift being specified by a set of coded shift selection signals; said circuit comprising: code entry and conversion matrix means responsive to the shift selection signals for producing a first set of converted signals during left shift operations, said first set of signals representing the amount of shifting, said matrix means producing a second set of converted signals during right shift operations representing the $n$'s complement of the amount of shifting; a shift control circuit responsive to each set of converted signals for producing one of a series of shift control signals, each shift control signal representing the amount specified by the corresponding set of converted signals; shifting means, including $n$ delay circuits, responsive to input signals for producing delayed signals after successively increasing delays, respectively; an output circuit; and a gating circuit, responsive to each shift control signal for applying the delayed input signals from a selected one of said delay circuits to said output circuit, said selected delay circuit having a time delay specified by the corresponding set of converted signals.

3. An electronic circuit for inverting the time position of a series of input signals representing a corresponding series of digits in response to an applied inversion control signal, said circuit comprising: first means responsive to the inversion control signal for producing a series of sets of converted signals, one for each of the input signals, each set of converted signals indicating the amount of shift required for the corresponding input signal to perform the inversion; shift control means responsive to said series of sets of converted signals for producing a corresponding series of shift control signals, each shift control signal representing the amount specified by the corresponding set of converted signals; shifting means, including delay circuits, responsive to applied signals for producing delayed signals after incrementally increased delays, the signals produced by a predetermined delay circuit being re-applied to provide a second set of applied signals; an output circuit; and a gating matrix, responsive to each shift control signal and coupled to said shifting means for providing selectively from said delay circuits for said output circuit an inverted series of signals in response to said input signals.

4. An electronic circuit for inverting the time position of a series of $n$ input signals representing a corresponding series of digits, the inversion being performed in $n$ digit time intervals in response to an applied inversion control signal, said circuit comprising: first means responsve to the inversion control signal for producing a series of sets of converted signals, one for each of the input signals, each set of converted signals indicating the amount of shift required for the corresponding input signal to perform the inversion; shift control means responsive to said series of sets of converted signals for producing a corresponding series of shift control signals, each shift control signal representing the amount specified by the corresponding set of converted signals; shifting means, including delay circuits, responsive to input signals for producing delayed output signals after successively increased delays; an output circuit; and a gating matrix, responsive to each shift control signal and to said shifting means for providing signals in a predetermined pattern from said delay circuits to said output circuits.

5. An electronic circuit for selectively shifting right, shifting left, and inverting the time position of a series of $n$ input signals $I_n \ldots I_1$, representing a corresponding series of digits, in response to applied control signals R$s$, L$s$, and V, respectively, the amount $k$ of the shifting being specified by an applied set of coded shift selection signals $Sh^j$, $k$ representing an integer digit length and $j$ indicating the selection code digit position, said circuit comprising: matrix conversion means, responsive to control signal L$s$ for converting signal set $Sh^j$ to a first set of converted signals $Sr^j$ representing an amount $k$, responsive to control signal R$s$ for converting signal set $Sh^j$ to a second set of converted signals $Sr^j$ representing an amount $n$-$k$, and responsive to control signal V for producing a series of converted signal sets $Sr^j$, one set for each of the input signals; a shift control matrix, responsive to each one of signal sets $Sr^j$ for producing one of a series of shift control signals $C_0 \ldots C_k \ldots C_n$, each signal $C_k$ representing the amount specified by said one signal set $Sr^j$; shifting means, including $n$ delay circuits, responsive to applied signals for producing delayed signals after delays of 1, . . . and $n$ digits, respectively; an output circuit; and gating circuit means, responsive to each control signal $C_k$ for applying the input signal associated therewith through a delay circuit of $k$ digit length to said output circuit.

6. An electronic circuit for selectively shifting the time position of a series of $n$ input signals $I_n \ldots I_1$ to the right and to the left in response to applied control signals R$s$ and L$s$, respectively, the amount $k$ of the shifting being specified by an applied set of coded shift selection signals $Sh^j$, $k$ representing an integer digit length and $j$ indicating the selection code digit position, said circuit comprising: first means responsive to signal L$s$ for convertng signal set $Sh^j$ to a first set of converted signals $Sr^j$ representing an amount $k$, and responsive to signal R$s$ for converting signal set $Sh^j$ to a second set of converted signals $Sr^j$ representing an amount $n-k$; second means responsive to each one of signal sets $Sr^j$ for producing one of a series of control signals $C_0 \ldots C_k \ldots C_n$, each signal $C_k$ representing the amount specified by said one signal set $Sr^j$; third means, including a plurality of delay circuits, responsive to applied input signals for producing delayed output signals after successively increasing digit pulses, respectively; an output circuit; and fourth means, responsive to each control signal $C_k$ for applying signals $I_n \ldots I_1$ through a delay circuit of $k$ digit length to said output circuit.

7. An electronic circuit for inverting, during $2n$ digit time intervals, the time position of a series of $n$ input signals $I_n \ldots I_1$ in response to an applied inversion control signal V, said circuit comprising: first means, responsive to signal V for producing a series of sets of converted signals $Sr^j$, one set for each of the input signals, each set indicating the amount of shift required for the corresponding input signal to perform the inversion; second means, responsive to said series of signal sets $Sr^j$ for producing a corresponding series of shift control signals $C_k$, $k$ being an integer successively assuming the values $1 \ldots 2i-1 \ldots$ and $n-1$ where $i$ is an integer less than $$\frac{n}{2}$$

third means, including delay circuits R1 . . . R2$i$–1 . . . R$n$–1 and R$n$ responsive to the applied input signals for producing output signals after delays of $1 \ldots 2i-1 \ldots n-1$ and $n$, respectively, the signals produced by delay circuit R$n$ being re-applied to provide a second set of input signals; an output circuit; and fourth means, responsive to each control signal $C_k$ for applying the associated input signals in the first and second sets through a delay circuit having a $k$ digit length to said output circuit.

8. An electronic circuit for inverting, during $n$ digit time intervals, the time position of a series of $n$ input signals $I_n \ldots I_1$ in responsive to an applied inversion control signal V, said circuit comprising: first means, responsive to signal V for producing a series of sets of converted signals $Sr^j$, one set for each of the input signals, each set indicating the amount of shift required for the corresponding input signal to perform the inversion; second means, responsive to said series of signal sets $Sr^j$ for producing a corresponding series of shift control signals $C_k$, $k$ being an integer successively assuming the values $1 \ldots 2i-1 \ldots$ and $2n-1$ where $i$ is an integer less than $$\frac{n}{2}$$

third means, including delay circuit R1 . . . R2$i$–1 . . . and R2$n$–1 responsive to the applied input signals for producing output signals after delays of $1 \ldots 2i-1 \ldots$ and $2n-1$, respectively; an output circuit; and fourth means, responsive to each control signal $C_k$ for applying the associated input signal through a delay circuit having a $k$ digit length to said output circuit.

9. A shifting and inverting circuit selectively operable in response to control signals R$s$, L$s$, and V, respectively, to shift right, shift left, and invert the time position of a series of $n$ input signals $I_n \ldots I_1$ representing a corresponding series of digits, the amount $k$ of the shifting being specified by an applied set of coded shift selection signals $Sh^j$, $k$ representing an integer digit length and $j$ indicating the selected code digit position, said shifting and inverting circuit comprising: first means, responsive to signal L$s$ for converting signal set $Sh^j$ to produce a first set of converted signals $Sr^j$ representing said amount $k$, responsive to signal R$s$ for converting signal set $Sh^j$ to produce a second set of converted signals $Sr^j$ representing the $n$'s complement of said amount $k$, and responsive to signal V for producing a series of converted signal sets $Sr^j$, one set for each of the input signals; second means, responsive to each set $Sr^j$ for producing one of a series of control signals $C_k$, each signal $C_k$ representing the amount specified by the corresponding set $Sr^j$; third means, including a plurality of delay circuits, responsive to applied input signals for producing delayed output signals after successively increasing digit delays, respectively; an output circuit; and fourth means, responsive to each control signal $C_k$ for applying the associated input signal through a delay circuit having a $k$ digit length to said output circuit.

10. An electronic circuit for inverting the time relation of a series of input signals comprising means providing a series of shift control signals for controlling the shift of said input signals, means for successively delaying said input signals by finite increments corresponding to the time between successive ones of the input signals in the series, and means including a gating matrix coupled in a particular interrelationship to said means providing a series of shift control signals and to said means for successively delaying and responsive to said shift control signals to provide, under control of said shift control signals, a series of output signals inverted with respect to the series of input signals.

11. An electronic circuit for inverting the time relation of a series of input signals in response to an applied inversion control signal, said circuit comprising: first means responsive to the inversion control signal for producing a series of shift signals, one for each of the input signals; shift control means responsive to said series of shift signals for producing a corresponding series of shift control signals; shifting means, including a plurality of delay circuits, for reproducing applied signals after successively increasing delays; and a gating matrix responsive to said shift control signals, coupled to said shifting means, and responsive with said shifting means to said input signals for selectively providing a series of output signals inverted in time with respect to said input signals.

References Cited in the file of this patent

UNITED STATES PATENTS

| | | |
|---|---|---|
| 2,674,733 | Robbins | Apr. 6, 1954 |
| 2,700,503 | Crosman | Jan. 25, 1955 |

OTHER REFERENCES

Coombs: "Storage of Numbers on Magnetic Tape," Proceedings of the Nat'l Elec. Conference, vol. III, 1947, pages 201–209.